United States Patent
Kim et al.

(10) Patent No.: US 10,296,233 B2
(45) Date of Patent: May 21, 2019

(54) METHOD OF MANAGING MESSAGE TRANSMISSION FLOW AND STORAGE DEVICE USING THE METHOD

(71) Applicant: Samsung Electronics Co., Ltd., Suwon-si, Gyeonggi-do (KR)

(72) Inventors: Seong-yeon Kim, Hwaseong-si (KR); Jin-woo Kim, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 520 days.

(21) Appl. No.: 14/978,174

(22) Filed: Dec. 22, 2015

(65) Prior Publication Data

US 2016/0231950 A1 Aug. 11, 2016

(30) Foreign Application Priority Data

Feb. 11, 2015 (KR) .......................... 10-2015-0020965

(51) Int. Cl.
*G06F 12/10* (2016.01)
*G06F 3/06* (2006.01)

(52) U.S. Cl.
CPC .......... *G06F 3/0613* (2013.01); *G06F 3/0656* (2013.01); *G06F 3/0659* (2013.01); *G06F 3/0688* (2013.01)

(58) Field of Classification Search
CPC .............................. G06F 3/0613; G06F 3/0659
USPC ........................................................ 711/103
See application file for complete search history.

(56) References Cited

U.S. PATENT DOCUMENTS

| | | | |
|---|---|---|---|
| 6,587,934 B2 * | 7/2003 | Miura | G06F 12/0215 365/185.12 |
| 7,565,439 B2 | 7/2009 | Mizuno et al. | |
| 8,185,713 B2 | 5/2012 | Shin et al. | |
| 8,438,453 B2 | 5/2013 | Post et al. | |
| 8,782,335 B2 | 7/2014 | Pinchover et al. | |
| 8,812,784 B2 | 8/2014 | Yeh | |
| 2003/0105929 A1 * | 6/2003 | Ebner | G06F 12/084 711/144 |
| 2010/0146163 A1 * | 6/2010 | Son | G06F 12/0246 710/54 |
| 2013/0036339 A1 * | 2/2013 | Shiraishi | G06F 12/04 714/763 |
| 2013/0046942 A1 | 2/2013 | Namba et al. | |
| 2013/0097460 A1 | 4/2013 | Jeong et al. | |
| 2013/0326113 A1 | 12/2013 | Wakrat et al. | |
| 2014/0223071 A1 | 8/2014 | Bert et al. | |

FOREIGN PATENT DOCUMENTS

| | | |
|---|---|---|
| JP | 2010-238336 A | 10/2010 |
| JP | 2012-133513 A | 7/2012 |

* cited by examiner

*Primary Examiner* — Jae U Yu
(74) *Attorney, Agent, or Firm* — Harness, Dickey & Pierce, P.L.C.

(57) ABSTRACT

A method of managing a message transmission flow and a storage device using the method are provided. The method of managing a message transmission flow includes receiving, at a storage device, response transmission type information in at least one of a command phase and a data phase, and transmitting response information to a host in at least one of a normal mode and a fast mode based on the received response transmission type information. The normal mode and the fast mode have different latencies.

20 Claims, 26 Drawing Sheets

FIG. 9

| Basic UPIU Header Format ||||
|---|---|---|---|
| Transaction Type | Flags | LUN | Task Tag |
| Resered | Command Set Type | Query Function, Task Manag. Function | Response | Status |
| Total EHS Lenght | Device Information | Data Segment Lenght ||

FIG. 10

| UPIU Type | Operational Flags | | | | Reserved | | Task Attribute | |
|---|---|---|---|---|---|---|---|---|
| | Bit 7 | Bit 6 | Bit 5 | Bit 4 | Bit 3 | Bit 2 | Bit 1 | Bit 0 |
| NOP Out | – | – | – | – | – | – | – | – |
| NOP In | – | – | – | – | – | – | – | – |
| Command | – | R | W | – | – | – | ATTR | |
| Response | – | O | U | D | – | – | – | – |
| Data Out | – | – | – | – | – | – | – | – |
| Data In | – | – | – | – | – | – | – | – |
| Ready to Transfer | – | – | – | – | – | – | – | – |
| Reject | – | – | – | – | – | – | – | – |
| Query Request | – | – | – | – | – | – | – | – |
| Query Response | – | – | – | – | – | – | – | – |
| Task Management Request | – | – | – | – | – | – | – | – |
| Task Management Response | – | – | – | – | – | – | – | – |
| NOTE 1 "–"denotes reserved values. | | | | | | | | |

FIG. 11

| UPIU Type | Operational Flags | | | | Reserved | | Task Attribute | |
|---|---|---|---|---|---|---|---|---|
| | Bit 7 | Bit 6 | Bit 5 | Bit 4 | Bit 3 | Bit 2 | Bit 1 | Bit 0 |
| NOP Out | – | – | – | – | – | – | – | – |
| NOP In | – | – | – | – | – | – | – | – |
| Command | – | R | W | – | – | F | ATTR | |
| Response | – | O | U | D | – | – | – | – |
| Data Out | – | – | – | – | – | F | – | – |
| Data In | – | – | – | – | – | F | – | – |
| Ready to Transfer | – | – | – | – | – | – | – | – |
| Reject | – | – | – | – | – | – | – | – |
| Query Request | – | – | – | – | – | – | – | – |
| Query Response | – | – | – | – | – | – | – | – |
| Task Management Request | – | – | – | – | – | – | – | – |
| Task Management Response | – | – | – | – | – | – | – | – |
| NOTE 1 "–"denotes reserved values. | | | | | | | | |

FIG. 12

| UPIU Type | Operational Flags | | | | Reserved | | Task Attribute | |
|---|---|---|---|---|---|---|---|---|
| | Bit 7 | Bit 6 | Bit 5 | Bit 4 | Bit 3 | Bit 2 | Bit 1 | Bit 0 |
| NOP Out | – | – | – | – | – | – | – | – |
| NOP In | – | – | – | – | – | – | – | – |
| Command | – | R | W | – | F | – | ATTR | |
| Response | – | O | U | D | – | – | – | – |
| Data Out | – | – | – | – | F | – | – | – |
| Data In | – | – | – | – | F | – | – | – |
| Ready to Transfer | – | – | – | – | – | – | – | – |
| Reject | – | – | – | – | – | – | – | – |
| Query Request | – | – | – | – | – | – | – | – |
| Query Response | – | – | – | – | – | – | – | – |
| Task Management Request | – | – | – | – | – | – | – | – |
| Task Management Response | – | – | – | – | – | – | – | – |
| NOTE 1 "–"denotes reserved values. | | | | | | | | |

FIG. 13

| COMMAND UPIU ||||
|---|---|---|---|
| 0<br>xx00 0001b | 1<br>Flags | 2<br>LUN | 3<br>Task Tag |
| 4<br>Resered \| Command Set Type | 5<br>Resered | 6<br>Resered | 7<br>Resered |
| 8<br>Total EHS Lenght (00h) | 9<br>Resered | 10  (MSB) | 11  (MSB) |
|  |  | Data Segment Lenght (0000h) ||
| 12  (MSB) | 13 | 14 | 15  (LSB) |
| Expected Data Transfer Lenght ||||
| 16<br>CDB[0] | 17<br>CDB[1] | 18<br>CDB[2] | 19<br>CDB[3] |
| 20<br>CDB[4] | 21<br>CDB[5] | 22<br>CDB[6] | 23<br>CDB[7] |
| 24<br>CDB[8] | 25<br>CDB[9] | 26<br>CDB[10] | 27<br>CDB[11] |
| 28<br>CDB[12] | 29<br>CDB[13] | 30<br>CDB[14] | 31<br>CDB[15] |
| Header E2ECRC (omit if HD = 0) ||||

FIG. 14

| Ready to Transfer UPIU |||||
|---|---|---|---|
| 0<br>xx11 0001b | 1<br>Flags | 2<br>LUN | 3<br>Task Tag |
| 4<br>Resered | 5<br>Resered | 6<br>Resered | 7<br>Resered |
| 8<br>Total EHS Lenght (00h) | 9<br>Resered | 10 (MSB) | 11 (MSB) |
| | | Data Segment Lenght (0000h) ||
| 12 (MSB) | 13 | 14 | 15 (LSB) |
| Data Buffer Offset ||||
| 16 (MSB) | 17 | 18 | 19 (LSB) |
| Data Transfer Count ||||
| 20 | 21 | 22 | 23 |
| Resered ||||
| 24 | 25 | 26 | 27 |
| Resered ||||
| 28 | 29 | 30 | 31 |
| Resered ||||
| Header E2ECRC (omit if HD = 0) ||||

FIG. 15

| Data Out UPIU ||||
|---|---|---|---|
| 0<br>xx00 0010b | 1<br>Flags | 2<br>LUN | 3<br>Task Tag |
| 4<br>Resered | 5<br>Resered | 6<br>Resered | 7<br>Resered |
| 8<br>Total EHS Lenght (00h) | 9<br>Resered | 10  (MSB) | 11  (MSB) |
| | | Data Segment Lenght || 
| 12  (MSB) | 13 | 14 | 15  (LSB) |
| Data Buffer Offset ||||
| 16  (MSB) | 17 | 18 | 19  (LSB) |
| Data Transfer Count ||||
| 20 | 21 | 22 | 23 |
| Resered ||||
| 24 | 25 | 26 | 27 |
| Resered ||||
| 28 | 29 | 30 | 31 |
| Resered ||||
| Header E2ECRC (omit if HD=0) ||||
| k<br>Data[0] | k+1<br>Data[1] | k+2<br>Data[2] | k+3<br>Data[3] |
| ... | ... | ... | ... |
| k+Lenght-4<br>Data[Lenght-4] | k+Lenght-3<br>Data[Lenght-3] | k+Lenght-2<br>Data[Lenght-2] | k+Lenght-1<br>Data[Lenght-1] |
| Data E2ECRC (omit if DD = 0) ||||
| NOTE 1  k=32 if HD = 0 ||||

FIG. 16

| Data In UPIU ||||
|---|---|---|---|
| 0<br>xx10 0010b | 1<br>Flags | 2<br>LUN | 3<br>Task Tag |
| 4<br>Resered | 5<br>Resered | 6<br>Resered | 7<br>Resered |
| 8<br>Total EHS Lenght (00h) | 9<br>Resered | 10 (MSB)<br>Data Segment Lenght | 11 (MSB) |
| 12 | 13 | 14 | 15 (LSB) |
| Data Buffer Offset ||||
| 16 (MSB) | 17 | 18 | 19 (LSB) |
| Data Transfer Count ||||
| 20 | 21 | 22 | 23 |
| Resered ||||
| 24 | 25 | 26 | 27 |
| Resered ||||
| 28 | 29 | 30 | 31 |
| Resered ||||
| Header E2ECRC (omit if HD=0) ||||
| k<br>Data[0] | k+1<br>Data[1] | k+2<br>Data[2] | k+3<br>Data[3] |
| ... | ... | ... | ... |
| k+Lenght-4<br>Data[Lenght-4] | k+Lenght-3<br>Data[Lenght-3] | k+Lenght-2<br>Data[Lenght-2] | k+Lenght-1<br>Data[Lenght-1] |
| Data E2ECRC (omit if DD = 0) ||||
| NOTE 1  k=32 if HD = 0 ||||

FIG. 17

| RESPONSE UPIU | | | |
|---|---|---|---|
| 0<br>xx10 0001b | 1<br>Flags | 2<br>LUN | 3<br>Task Tag |
| 4<br>Resered \| Command Set Type | 5<br>Resered | 6<br>Resered | 7<br>Resered |
| 8<br>Total EHS Lenght (00h) | 9<br>Device Information | 10 (MSB) | 11 (MSB) |
| | | Data Segment Lenght | |
| 12 (MSB) | 13 | 14 | 15 (LSB) |
| Residual Transfer Count | | | |
| 16 | 17 | 18 | 19 |
| Resered | | | |
| 20 | 21 | 22 | 23 |
| Resered | | | |
| 24 | 25 | 26 | 27 |
| Resered | | | |
| 28 | 29 | 30 | 31 |
| Resered | | | |
| Header E2ECRC (omit if HD=0) | | | |
| k (MSB) | k+1 (LSB) | k+2<br>Sense Data[0] | k+3<br>Sense Data[1] |
| Sense Data Lenght | | | |
| ... | ... | ... | ... |
| k+16<br>Sense Data[14] | k+17<br>Sense Data[15] | k+18<br>Sense Data[16] | k+19<br>Sense Data[17] |
| Data E2ECRC (omit if DD = 0) | | | |
| NOTE 1  k=32 if HD = 0 | | | |

METHOD OF MANAGING MESSAGE TRANSMISSION FLOW AND STORAGE DEVICE USING THE METHOD

CROSS-REFERENCE TO RELATED APPLICATION

This U.S. non-provisional application claims the benefit of priority under 35 U.S.C. § 119 to Korean Patent Application No. 10-2015-0020965 filed in the Korean Intellectual Property Office on Feb. 11, 2015, the disclosure of which is incorporated herein in its entirety by reference.

BACKGROUND

Field

Example embodiments of the inventive concepts relate to a method and an apparatus for transmitting a message between a host and a device, and to a method of managing a message transmission flow and a storage device using the method.

Description of Related Art

In general, interface standards that are used for message transmission between a host and a device have transmission flow including a command phase, a data phase, and a status phase. The status phase is a period for transmitting response information to the host after the device transmits or receives data. Accordingly, research into a method of minimizing latency between the data phase and the status phase is needed to improve system performance.

SUMMARY

According to an example embodiment of inventive concepts provides a method of managing a message transmission flow to reduce latency between a data phase and a status phase.

An example embodiment of inventive concepts provides a storage device that manages a message transmission flow to reduce latency between a data phase and a status phase.

According to an example embodiment of inventive concepts, there is provided a method of managing a message transmission flow, the method including receiving, at a storage device, response transmission type information in at least one selected from a command phase and a data phase, and transmitting response information to a host during at least one of a normal mode and a fast mode having based on the received response transmission type information, the normal and fast mode having different latencies. The response transmission type information is a reserved bit, the reserved bit is included in at least one of a header of command information and in a header of data, and the host is configured to transmit the reserved bit.

The method of managing the message transmission flow further comprising interfacing between the host and the storage device based on a transmission flow, the transmission flow including a command phase, a data phase and a status phase.

The receiving of the response transmission type information is through a reserved bit included in a universal flash storage (UFS) protocol information unit (UPIU) header, if the host and the storage device interface with each other using the UFS. In an example embodiment, the receiving of the response transmission type information is in a read data transmission flow and/or in a write data transmission flow, the storage device is configured to receive the response transmission type information through a reserved bit, the reserved bit is included in a header of command information and/or in a header of data. The reserved bit is included in a header of final data in the data phase.

The transmitting of the response information to the house further comprises, determining whether a response transmission mode is at least one of the normal mode and the fast mode based on the received response transmission type information; loading the response information on final data; transmitting to the host the response information and the final data in the data phase if it is determined that the response transmission mode in a read data transmission flow is the fast mode; transmitting the response information to the host after receiving final data from the host if it is determined that the transmission mode in a write data transmission flow is the fast mode; and receiving the final data if the response information of the fast mode is received through a reserved bit included in a header of the final data of the data phase in the write data transmission flow.

The transmitting of the response information and the final data to the host further comprises, setting a reserved bit and loading the response information on the final data to transmit both the response information and the final data to the host. The reserved bit is configured to indicate the response transmission type information included in a header of final data in the data phase, and assign a value indicating the response transmission type information of the fast mode if it is determined that in the read data transmission flow the mode is the fast mode.

According to another non-limiting example embodiment of inventive concepts, there is provided a storage device including a memory device, and a memory controller configured to write data to the memory device or reading data from the memory device based on command received from a host, transmit a response information to the host in format least one of a normal mode and a fast mode based on a response transmission type information received from the host, the normal mode and the fast mode having different latencies, interfacing between the host and the memory device based at least one of a command phase and a data phase.

The memory controller is further configured to receive the response transmission type information through a reserved bit; the reserved bit is included in at least one of a header of command information and data transmitted from the host.

The memory controller of the example embodiment further comprises a command queue configured to store command information received from the host; a buffer memory configured to store data, the data stored is either received from the host or read from the memory device; and a controller. The controller is configured to load the response information on final data read from the buffer memory based on a read command when the response transmission type information set to the fast mode in a read data transmission flow is received, and transmit the response information and the final data to the host. The controller is also configured to set a reserved bit and load the response information on the final data to transmit both the response information and the final data to the host. According to another non-limiting example embodiment of inventive concepts, there is provided a computing system including a host and a storage device. The host is configured to transmit response transmission type information to a storage device in at least one of a command phase and a data phase. The storage device is configured to transmit response information to the host in at least one of a normal mode and/or a fast mode based on the response transmission type information received from the host. The normal mode and the fast mode having different latencies.

In some example embodiments, in accordance with inventive concept, when it is determined that a response transmission mode in a read data transmission flow is the fast mode, the storage device loads the response information on final data to be transmitted to the host in the data phase and transmits both the response information and the final data to the host.

BRIEF DESCRIPTION OF THE DRAWINGS

The foregoing and other features of the inventive concepts will be apparent from the more particular description of non-limiting example embodiments of the inventive concepts, as illustrated in the accompanying drawings in which like reference characters refer to like parts throughout the different views. The drawings are not necessarily to scale, emphasis instead being placed upon illustrating principles of the inventive concepts. In the drawings:

FIG. 9 is a diagram illustrating a universal flash storage (UFS) protocol information unit (UPIU) header format according to an example embodiment of inventive concepts;

FIG. 10 is a diagram illustrating content of a flag field of a UPIU header according to a JEDEC standard;

FIG. 11 is a diagram illustrating the definition of a flag field of a UPIU header according to an example embodiment of inventive concepts;

FIG. 12 is a diagram illustrating the definition of a flag field of a UPIU header according to another example embodiment of inventive concepts;

FIG. 13 is a diagram illustrating content of a command UPIU according to an example embodiment of inventive concepts;

FIG. 14 is a diagram illustrating content of a ready to transfer (RTT) UPIU according to an example embodiment of inventive concepts;

FIG. 15 is a diagram illustrating content of a data out UPIU according to an example embodiment of inventive concepts;

FIG. 16 is a diagram illustrating content of a data in UPIU according to an example embodiment of inventive concepts;

FIG. 17 is a diagram illustrating content of a response UPIU according to an example embodiment of inventive concepts;

DETAILED DESCRIPTION OF EXAMPLE EMBODIMENTS

Figure 1:
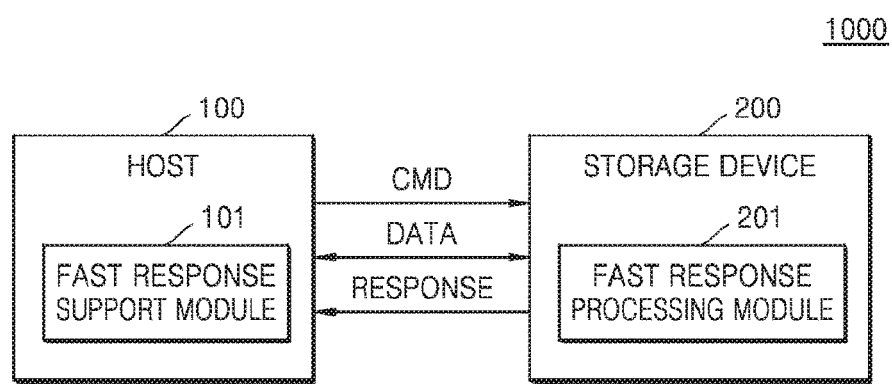
FIG. 1 is a diagram illustrating a structure of a computing system according to an example embodiment of inventive concepts.

The inventive concept now will be described more fully hereinafter with reference to the accompanying drawings, in which elements of the inventive concepts are shown. The inventive concepts may, however, be embodied in many different forms and should not be construed as limited to the exemplary embodiments set forth herein. Rather, these example embodiments, in accordance with the inventive concepts, are provided so that this disclosure will be thorough and complete, and will fully convey the scope of the inventive concepts to one of ordinary skill in the art. As the inventive concepts allow for various changes and numerous embodiments, particular embodiments will be illustrated in the drawings and described in detail in the written description. However, this is not intended to limit the inventive concepts to particular modes of practice, and it is to be appreciated that all changes, equivalents, and substitutes that do not depart from the spirit and technical scope of the inventive concepts are encompassed in the inventive concepts. Like reference numerals refer to like elements throughout. Sizes of structures may be greater or less than real structures for clarity of the inventive concepts.

The terminology used herein is for the purpose of describing particular embodiments only and is not intended to be limiting of exemplary embodiments. As used herein, the singular forms "a", "an", and "the" are intended to include the plural forms as well, unless the context clearly indicates otherwise. It will be further understood that the terms "comprises", "comprising", "includes", and/or "including" when used herein, specify the presence of stated features, integers, steps, operations, elements, components, or combinations thereof but do not preclude the presence or addition of one or more other features, integers, steps, operations, elements, components, or combinations thereof.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. As used herein, the term "and/or" includes any and all combinations of one or more of the associated listed items.

FIG. 1 is a diagram illustrating a structure of a computing system 1000 according to an example embodiment of the inventive concept.

As illustrated in FIG. 1, the computing system 1000 includes a host 100 and a storage device 200.

The host 100 and the storage device 200 are electrically connected to each other. A standard of an interface that is used between the host 100 and the storage device 200 has a transmission flow including a command phase, a data phase, and a status phase. Response information is transmitted in the status phase.

For example, interfaces including, but not limited to, may be applied to the example embodiments of the inventive concepts between the host 100 and the storage device 200: a universal flash storage (UFS) interface, an embedded multi-media card (eMMC) interface, a serial advanced technology attachment (SATA) interface, a serial advanced technology attachment express (SATAe) interface, a small computer system interface (SCSI), a small computer system interface express (SCSIe) interface, and/or a non-volatile memory express (NVMe).

The host 100 transmits a command CMD, which is issued based on a task to be performed, to the storage device 200. For example, the command CMD issued from the host 100 may include a write command and/or a read command. The host 100 transmits data DATA to be stored in the storage device 200 and/or receives data DATA read from the storage device 200. The storage device 200 transmits response information RESPONSE, which indicates a result of command execution, to the host 100.

In an example embodiment of the inventive concepts, when data to be processed is stored in the storage device 200, the host 100 transmits a read command to the storage device 200. The host 100 transmits a write command to the storage device 200 to store processed data in the storage device 200.

In another example embodiment of the inventive concepts, the host 100 transmits a read command and/or a write command, which is used for performing at least one selected from a page-in operation and a page-out operation for a memory swapping operation when a page fault occurs, to the storage device 200. The page fault occurs when a page, which is required to be read to perform an application process in the host 100, is not stored in the host 100.

The storage device 200 performs a read operation and/or a program operation according to a command received from the host 100. In other words, the storage device 200 performs a read operation for reading data in response to a read command received from the host 100. The storage device 200 performs a program operation for storing data in response to a write command received from the host 100.

The storage device 200 transmits the response information RESPONSE, which indicates a result of the execution of a command received from the host 100, to the host 100. For example, in response to a write command received from the host 100, the storage device 200 receives data from the host 100, processes the data according to the write command, and then transmits response information RESPONSE, which indicates whether the write command was normally executed, to the host 100. In another example embodiment of the inventive concepts, in response to a read command received from the host 100, the storage device 200 transmits data read therefrom to the host 100 and then transmits response information RESPONSE, which indicates whether the read command was normally executed, to the host 100.

In example embodiment of the inventive concepts, the host 100 includes a fast response support module 101, and the storage device 200 includes a fast response processing module 201.

The fast response support module 101 and the fast response processing module 201 are modules for reducing latency between a data phase and a status phase and may be implemented with software and/or hardware.

The fast response support module 101 supports an operation of setting response transmission type information in at least one selected from a command phase and/or a data phase. For example, a reserved bit included in a header of command information or a header of data may be allocated as a bit for determining a response transmission type.

The fast response support module 101 may set response transmission type information by using a reserved bit included in a header of command information or a header of data, to be transmitted to the storage device 200. In other words, the response transmission type information may be set by using a reserved bit allocated for the response transmission type information.

In an example embodiment of the inventive concepts, the fast response support module 101 may set response transmission type information of a fast mode to a default value. As another example of the inventive concepts, the fast response support module 101 may also set response transmission type information of a normal mode to a default value. As another example of the inventive concepts, the fast response support module 101 may also set response transmission type information of the normal mode or the fast mode based on a vendor's selection and/or a user's selection.

In an example embodiment of the inventive concepts, the fast response support module 101 may set response transmission type information by using a reserved bit included in a header of command information in a command phase of a read data transmission flow. In detail, the fast mode may be set when a bit allocated to define a response transmission type from among reserved bits included in a header of command information in a command phase of a read data transmission flow is set to a first logic value, and the normal mode may be set when the bit is set to a second logic value.

In an example embodiment of the inventive concepts, the fast response support module 101 may set response transmission type information by using a reserved bit included in a header of command information in a data phase of write data transmission flow. The fast mode may be set when a bit allocated to define a response transmission type from among reserved bits included in a header of final data that is transmitted to the storage device 200 in a data phase of a write data transmission flow is set to a first logic value, and the normal mode may be set when the bit is set to a second logic value.

In an example embodiment of the inventive concepts, the fast response support module 101 supports a function of parsing response information received after data and processing parsed information when a bit allocated to determine a response transmission type from among reserved bits included in a header of data that is received from the storage device 200 in a data phase of a read data transmission flow is set to a value indicating the fast mode.

The fast response processing module 201 supports a function of transmitting response information to the host 100 in any one selected from the normal mode and the fast mode having different latencies, based on response transmission type information received in at least one selected from a command phase and/or a data phase.

In an example embodiment of the inventive concepts, when response transmission type information set to a fast mode in a write data transmission flow is received from the host 100, the fast response processing module 201 directly generates response information when the fast response processing module 201 receives final data from the host 100 and transmits the generated response information to the host 100.

In an example embodiment of the inventive concepts, when response transmission type information set to a fast mode in a read data transmission flow is received from the host 100, the fast response processing module 201 loads response information on final data that is transmitted to the host 100 in a data phase, and transmits the data loaded with the response information to the host 100. In detail, when response transmission type information set to a fast mode in a read data transmission flow is received from the host 100, the fast response processing module 201 sets a bit, allocated to define a response transmission type from among reserved bits included in a header of final data to be transmitted to the host 100, to a value indicating the fast mode, and loads response information on the final data and transmits the final data loaded with the response information to the host 100.

Figure 2:
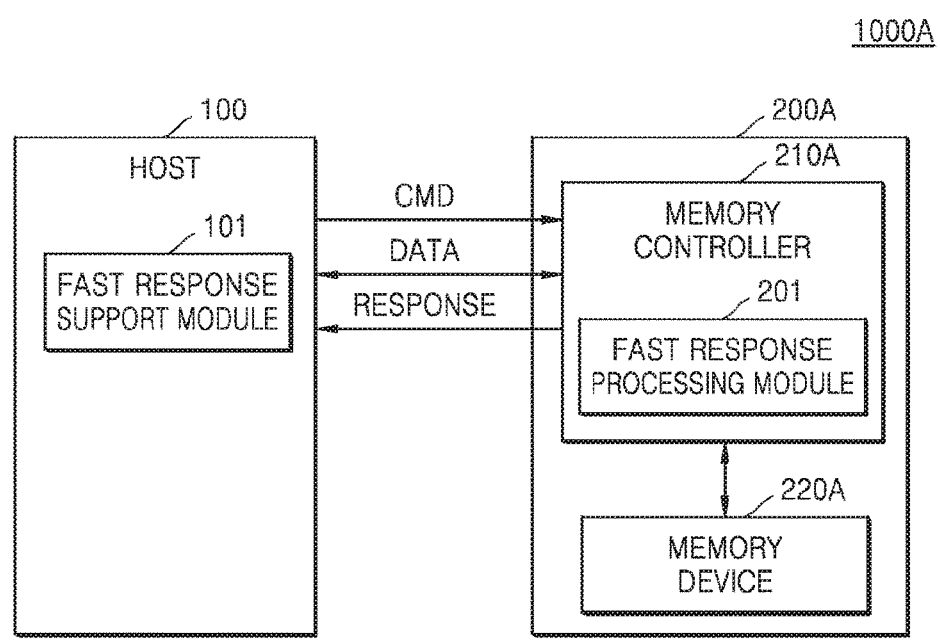
FIG. 2 is a diagram of a computing system showing a detailed structure of a storage device illustrated in FIG. 1.

FIG. 2 is a diagram of a computing system 1000a showing a detailed structure of the storage device 200 illustrated in FIG. 1.

As illustrated in FIG. 2, the computing system 1000A includes a host 100 and a storage device 200A. The host 100 and the storage device 200A correspond to the host 100 and the storage device 200, respectively, of FIG. 1. The storage device 200A includes a memory controller 210A and a memory device 220A.

In an example embodiment of the inventive concepts, the computing system 1000A may be including, but not limited to, a personal computer, a set-top-box, a digital camera, a navigation device, a mobile device, and/or a smart card system.

The host 100 has been described above with reference to FIG. 1, and thus, repeated descriptions thereof are omitted.

The memory device 220A may be any one of various types of memory devices. In addition, the memory device 220A may be a flash memory device that is a type of non-volatile memory device. Examples of non-volatile memory devices include, but are not limited to, phase change RAM (PRAM), ferroelectric RAM (FRAM), magnetic RAM (MRAM) as well as a flash memory device may be used as the memory device 220A. In an example embodiment of the inventive concepts, the memory device 220A may have a structure obtained by combining at least one non-volatile memory device with at least one volatile memory device, and the memory device 220A may also have a structure obtained by combining at least two types of non-volatile memory devices with each other.

The memory controller 210A performs an input/output (IO) processing operation in response to a command received from the host 100 so that the memory device 220A performs a read operation and/or a write operation.

The memory controller 210A transmits response information RESPONSE, which indicates a result of the execution of a command received from the host 100, to the host 100. In an example embodiment of the inventive concepts, in response to a write command received from the host 100, the storage device 200A receives data from the host 100, processes the data according to the write command, and then transmits response information RESPONSE, which indicates whether the write command was normally executed, to the host 100. In an example embodiment of inventive concepts, in response to a read command received from the host 100, the storage device 200A transmits data read therefrom to the host 100 and then transmits response information RESPONSE, which indicates whether the read command was normally executed, to the host 100.

The memory controller 210A includes a fast response processing module 201. The fast response processing module 201 has been described above, and thus, repeated descriptions thereof are omitted.

When response transmission type information set to a fast mode in a read data transmission flow is received from the host 100, the memory controller 210A loads response information RESPONSE on final data, which is transmitted to the host 100 in a data phase, by using the fast response processing module 201, and transmits the data loaded with the response information to the host 100. In an example embodiment of the inventive concepts, the memory controller 210A sets a bit, allocated to define a response transmission type from among reserved bits included in a header of final data to be transmitted to the host 100, to a value indicating the fast mode, and loads response information on the final data and transmits the final data loaded with the response information to the host 100.

When response transmission type information set to a fast mode in a write data transmission flow is received from the host 100, the memory controller 210A directly generates response information by using the fast response processing module 201 when the memory controller 210A receives final data from the host 100, and transmits the generated response information to the host 100.

Figure 3:
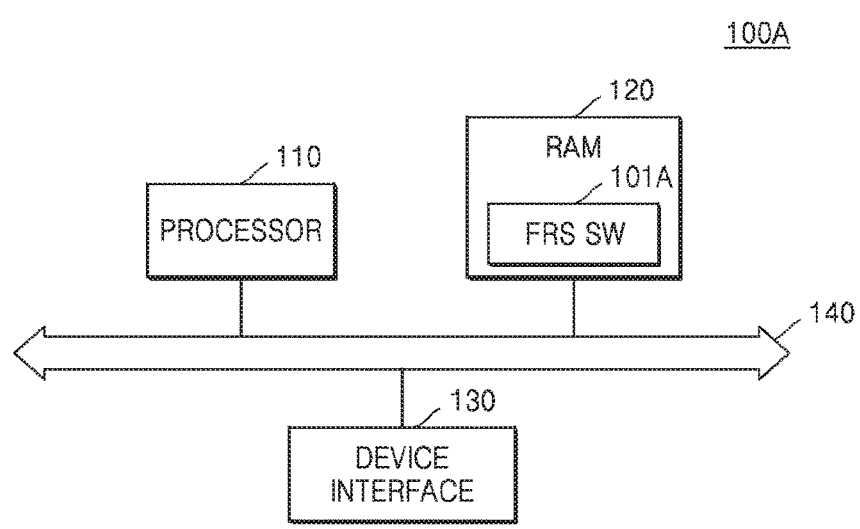
FIG. 3 is a diagram illustrating a structure of a host illustrated in FIG. 1.

FIG. 3 is a diagram illustrating a structure of a host 100A corresponding to the host 100 illustrated in FIG. 1.

Referring to FIG. 3, the host 100A includes a processor 110, random access memory (RAM) 120, a device interface 130, and a bus 140.

The processor 110, the RAM 120, and the device interface 130 are electrically connected to each other via the bus 140. The processor 110, the RAM 120, and the device interface 130 may send and receive data and various control signals to and from each other via the bus 140.

The processor 110 may include, but not limited to, circuits for processing data and controlling operations of elements of the host 100A, interface circuits, and/or program codes. In an example embodiment of the inventive concepts, the processor 110 may include, but not limited to, a central processing unit (CPU), an advanced RISC machine (ARM), and/or an application specific integrated circuit (ASIC).

The RAM 120 may include SRAM and/or DRAM for storing data, commands, and/or program codes that are needed for an operation of the host 100A. The RAM 120 functions as a main memory. The RAM 120 stores a fast response support software (FRS SW) 101A. The FRS SW 101A includes program codes for performing a function of the fast response support module 101 described above with reference to FIG. 1.

The device interface 130 includes a data exchange protocol for exchanging data with a device connected to the host 100A and performs an interface between the host 100A and the device. In an example embodiment of the inventive concepts, the device connected to the host 100A may be a storage device.

Example embodiments of the device interface 130 may include, but are not limited to, a UFS interface, an advanced technology attachment (ATA) interface, a SATA interface, a SATAe interface, a parallel advanced technology attachment (PATA) interface, a universal serial bus (USB), a serial attached small computer system (SAS) interface, a small computer system interface (SCSI), a SCSIe, an embedded multimedia card (eMMC) interface, and/or a non-volatile memory express (NVMe) interface. However, the inventive concept is not limited thereto. Various standard interfaces having a transmission flow including a command phase, a data phase, and a status phase may be applied to the device interface 130.

The device interface 130 may transmit a command and data to a device and/or receive data and response information from the device, according to the control of the processor 110.

The processor 110 transmits response transmission type information to a device, connected to the device interface 130, in at least one of a command phase and a data phase by using program codes stored in the RAM 120. In an example embodiment of the inventive concepts, the processor 110 may drive the FRS SW 101A stored in the RAM 120 to perform a message transmission flow management operation by using a method as illustrated in FIGS. 18 through 23.

Figure 4:
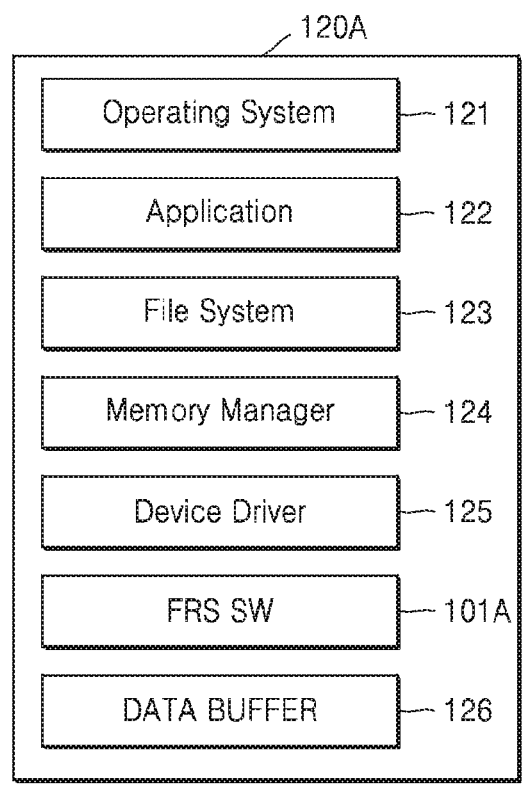
FIG. 4 is a diagram illustrating a program and data which are stored in RAM illustrated in FIG. 3.

FIG. 4 is a diagram illustrating a program and data which are stored in RAM 120A that corresponds to the RAM 120 illustrated in FIG. 3.

Referring to FIG. 4, the RAM 120A may store an operating system 121, an application 122, a file system 123, a memory manager 124, a device driver 125, and a fast response support software (FRS SW) 101A. In addition, a region for a data buffer 126 may be assigned in the RAM 120A.

The operating system 121 is a program for controlling hardware and/or software resources of the host 100A. The operating system 121 functions as an interface between hardware and an application program, and manages resources of the host 100A.

The application 122 includes various application programs that are executed in the host 100A. In an example embodiment of the inventive concepts, the application 122 may include programs that support an operation for processing files and/or data.

The file system 123 is a program that manages logical addresses and storage locations to store files and/or data in the RAM 120A of the host 110A, and/or the storage device 200A connected to the host 100A, and/or to search for files and/or data.

The memory manager 124 is a program that controls a memory access operation for the RAM 120A, and/or a memory access operation for the storage device 200A connected to the host 100A.

The device driver 125 is a program that supports communication with the storage device 200A connected to the host 100A.

The FRS SW 101A has been described above, and thus repeated descriptions thereof are omitted.

The data buffer 126 is a storage region assigned to store data received from the storage device 200A, and/or data to be transmitted to the storage device 200A.

Figure 5:
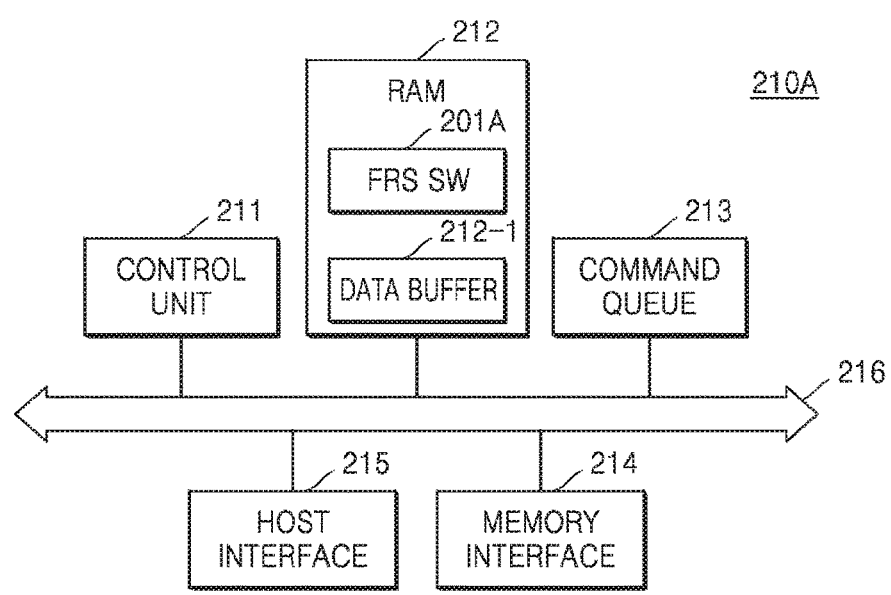
FIG. 5 is a diagram illustrating a detailed structure of a memory controller illustrated in FIG. 2.

FIG. 5 is a diagram illustrating a detailed structure of the memory controller 210A illustrated in FIG. 2.

As illustrated in FIG. 5, the memory controller 210A includes a control unit 211, RAM 212, a command queue 213, a memory interface 214, a host interface 215, and a bus 216.

The control unit 211, the RAM 212, the command queue 213, the memory interface 214, and the host interface 215 are electrically connected to each other via the bus 216. Accordingly, data, addresses, and/or various control signals may be transmitted or received between the components of the memory controller 210A via the bus 216.

The RAM 212 may include an SRAM and/or DRAM for storing data, commands, and/or program codes that are necessary for an operation of the memory controller 210A.

A region for a data buffer 212-1, in which data transmitted from the host 100, and/or data to be transmitted to the host 100, is temporarily stored, and is assigned in the RAM 212. Data to be stored in the memory device 220A connected through the memory interface 214, and/or data read from the memory device 220A, is temporarily stored in the data buffer 212-1 of the RAM 212. An FRP SW 201A is stored in the RAM 212. The FRP SW 201A includes program codes for performing a function of the fast response processing module 201 illustrated in FIG. 1.

Commands received from the host 100 through the host interface 215, are sequentially stored in the command queue 213.

The control unit 211 controls an overall operation of the storage device 200A. The control unit 211 performs a write operation, and/or read operation processing based on a command received from the host 100.

In an example embodiment of the inventive concepts, the control unit 211 stores a command received from the host 100 in the command queue 213. Also, the control unit 211 stores data received from the host 100, and/or data transmitted to the host 100 in the data buffer 212-1 of the RAM 212.

In response to a write command received from the host 100, the control unit 211 assigns a buffer region, in which host data will be stored. Upon assigning a buffer region by the control unit 211, the data buffer 212-1 then transmits a message, which informs the host 100 that it is ready to receive data, to the host 100. The control unit 211 stores data received from the host 100 in an assigned region of the data buffer 212-1. The control unit 211 transmits response information indicating a processing state of the write command received from the host 100 to the host 100.

In response to a read command received from the host 100, the control unit 211 reads data from the memory device 220A, according to the read command, and stores the read data to the data buffer 212-1. Then, the control unit 211 reads data from the data buffer 212-1 and transmits the read data to the host 100 through the host interface 215. The control unit 211 transmits response information indicating a processing state of the read command received from the host 100 to the host 100.

The control unit 211 transmits response information to the host 100 in any one selected from the normal mode and/or the fast mode having different latencies, based on response transmission type information received in at least one selected from a command phase and a data phase.

In an example embodiment of the inventive concepts, when response transmission type information set to a fast mode in a write data transmission flow is received from the host 100, the control unit 211 drives the FRP SW 201A stored in the RAM 212, and transmits the response information to the host 100 in the fast mode. In detail, in a fast mode of write data transmission flow, the control unit 211 directly generates response information when receiving final data from the host 100, and transmits the generated response information to the host 100.

In an example embodiment of the inventive concepts, when response transmission type information set to a fast mode in a read data transmission flow is received from the host 100, the control unit 211 drives the FRP SW 201A stored in the RAM 212, and transmits the response information to the host 100 in the fast mode. In detail, in a fast mode of a read data transmission flow, the control unit 211 loads response information on final data to be transmitted to the host 100 in a data phase, and transmits the data loaded with the response information to the host 100. Accordingly, when response transmission type information set to a fast mode in a read data transmission flow is received from the host 100, the control unit 211 sets a bit, allocated to define a response transmission type from among reserved bits included in a header of final data to be transmitted to the host 100, to a value indicating the fast mode, and loads response information on the final data, and transmits the final data loaded with the response information to the host 100.

When response transmission type information set to a fast mode in a write data transmission flow, and/or a read data transmission flow, is not received from the host 100, the control unit 211 transmits the response information to the host 100 in a normal mode.

In an example embodiment of the inventive concepts, when response transmission type information set to a normal mode in a write data transmission flow is received from the host 100, the control unit 211 receives final data from the host 100 and stores the received final data in the data buffer 212-1. Furthermore, the control unit 211 transmits response information indicating a processing state of a write command to the host 100 after completing an operation of writing data stored in the data buffer 212-1 to the memory device 220A connected through the memory interface 214.

In an example embodiment of the inventive concepts, when response transmission type information set to a normal mode in a write data transmission flow is received from the host 100, the control unit 211 receives final data from the host 100 and stores the received final data in the data buffer 212-1. Then, the control unit 211 completes the storing of host data in the data buffer 212-1, and then generates response information indicating a processing state of a write command and transmits the generated response information to the host 100. That is, the control unit 211 may transmit response information indicating a processing state of a write command to the host 100 before performing an operation of writing host data stored in the data buffer 212-1 to the memory device 220A.

In an example embodiment of the inventive concepts, when response transmission type information set to a normal mode in a read data transmission flow is received from the host 100, the control unit 211 completes a process of reading data, requested by the host 100, from the data buffer 212-1, and transmitting the read data to the host 100, and then generates response information indicating a processing state of a read command and transmits the generated response information to the host 100.

In an example embodiment of the inventive concepts, when response transmission type information set to a normal mode in a read data transmission flow is received from the host 100, the control unit 211 completes a process of reading data, requested by the host 100, from the data buffer 212-1, and transmitting the read data to the host 100, and then may generate response information indicating a processing state of a read command after emptying the data buffer 212-1 to transmit the generated response information to the host 100.

The memory interface 214 is electrically connected to the memory device 220A. The memory interface 214 may transmit a command, an address, and data to the memory device 220A under the control of the control unit 211, and/or may receive data from the memory device 220A. The memory interface 214 may be configured to support NAND flash memory and/or NOR flash memory. The memory interface 214 may be configured to perform software, and/or hardware interleaving operations, via a plurality of channels.

The host interface 215 includes a protocol for exchanging data with the host 100, and interfaces the storage device 200A with the host 100. The host interface 215 may be implemented by using interfaces including, but not limited to, a UFS interface, an ATA interface, a SATA interface, a SATAe interface, a PATA interface, a USB or SAS interface, a SCSI, a SCSIe, an eMMC interface, and/or an NVMe interface. The various standard interfaces having a transmission flow including a command phase, a data phase, and/or a status phase may be applied to the host interface 215.

Figure 6:
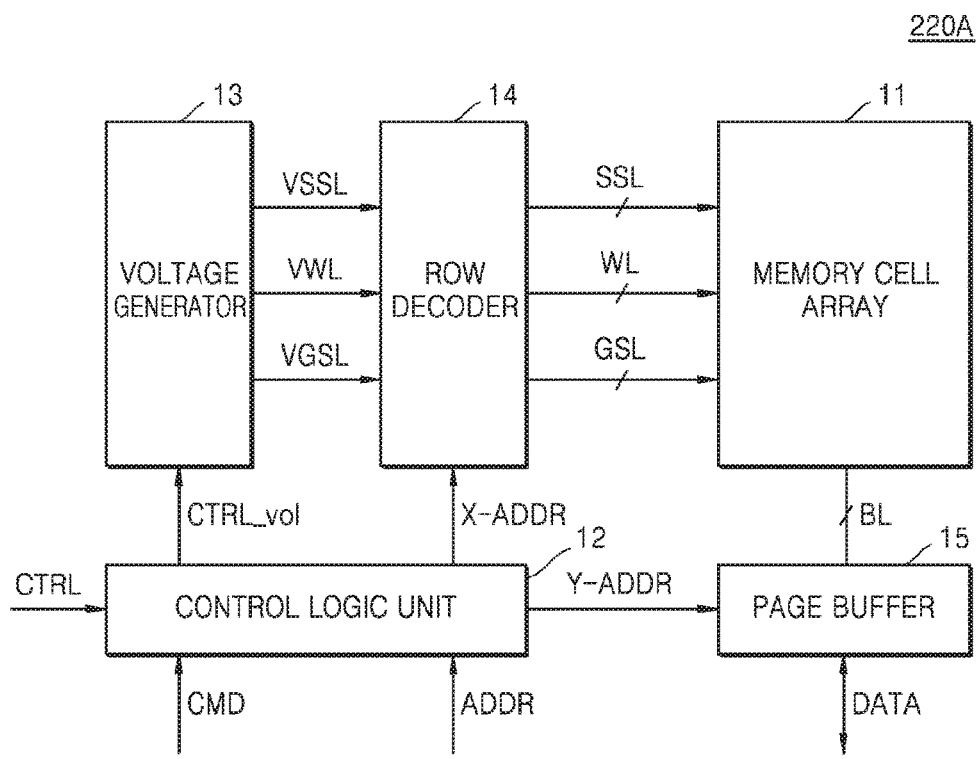
FIG. 6 is a diagram illustrating a detailed structure of a memory device illustrated in FIG. 2.

FIG. 6 is a diagram illustrating a detailed structure of the memory device 220A illustrated in FIG. 2.

Referring to FIG. 6, the memory device 220A may include a memory cell array 11, a control logic unit 12, a voltage generator 13, a row decoder 14, and a page buffer 15. The components included in the memory device 220A will now be described in detail.

The memory cell array 11 may be connected to at least one string selection line SSL, a plurality of word lines WL, and at least one ground selection line GSL, and may also be connected to a plurality of bit lines BL. The memory cell array 11 may include a plurality of memory cells MC (refer to FIG. 8) that are disposed at intersections of the plurality of bit lines BL and the plurality of word lines WL.

When an erasure voltage is applied to the memory cell array 11, the plurality of memory cells MC enter an erasure state. When a programming voltage is applied to the memory cell array 11, the plurality of memory cells MC enter a program state. At this time, each memory cell MC may have one selection from an erasure state, and first through n-th program states, P1 through Pn that are distinguished from each other according to a threshold voltage.

In the first through n-th program states P1 through Pn, n may be a natural number equal to or greater than 2. For example, when each memory cell MC is a 2-bit level cell, n may be 3. In an example embodiment of the inventive concepts, when each memory cell MC is a 3-bit level cell, n may be 7. In another example, when each memory cell MC is a 4-bit level cell, n may be 15. As such, the plurality of memory cells MC may include multi-level cells. However, exemplary embodiments of the inventive concept are not limited thereto, and the plurality of memory cells MC may include single-level cells.

The control logic unit 12 may receive a command signal CMD, an address signal ADDR, and a control signal CTRL from the memory controller 210A to output various control signals for writing the data DATA to the memory cell array 11 or for reading the data from the memory cell array 11. In this way, the control logic unit 12 may control overall operations of the memory device 220A.

The various control signals output by the control logic unit 12 may be provided to the voltage generator 13, the row decoder 14, and the page buffer 15. In detail, the control logic unit 12 may provide a voltage control signal CTRL_vol to the voltage generator 13, may provide a row address signal X_ADDR to the row decoder 14, and may provide a column address signal Y_ADDR to the page buffer 15.

The voltage generator 13 may receive the voltage control signal CTRL_vol to generate various voltages for executing a program operation, a read operation and an erasure operation with respect to the memory cell array 11. In detail, the voltage generator 13 may generate a first drive voltage VWL for driving the plurality of word lines WL, a second drive voltage VSSL for driving the at least one string selection line SSL, and a third drive voltage VGSL for driving the at least one ground selection line GSL.

The first drive voltage VWL may be a program (or write) voltage, a read voltage, an erasure voltage, a pass voltage, and/or a program verification voltage. The second drive voltage VSSL may be a string selection voltage SSL, including but not limited to, an on voltage or an off voltage. The third drive voltage VGSL may be a ground selection voltage GSL, including but not limited to, an on voltage or an off voltage.

According to an example embodiment of the inventive concepts, the voltage generator 13 may receive the voltage control signal CTRL_vol to generate a program start voltage as a program voltage, when a program loop starts, when the number of program loops performed is 1. As the number of program loops performed increases, the voltage generator 13 may generate a voltage that increases from the program start voltage by a step voltage in stages, as the program voltage.

The row decoder 14 may be connected to the memory cell array 11 through the plurality of word lines WL and may activate some of the plurality of word lines WL in response to the row address signal X_ADDR received from the control logic unit 12. In detail, during a read operation, the row decoder 14 may apply a read voltage to a word line selected from the plurality of word lines WL, and apply a pass voltage to the remaining unselected word lines.

During a program operation, the row decoder 14 may apply a program voltage to the selected word line, and apply the pass voltage to the unselected word lines. According to an example embodiment of the inventive concepts, the row decoder 14 may apply a program voltage to the selected word line and an additionally selected word line, in at least one selected from a plurality of program loops.

The page buffer 15 may be connected to the memory cell array 11 via the plurality of bit lines BL. In detail, during a read operation, the page buffer 15 may operate as a sense amplifier so as to output data DATA stored in the memory cell array 11. During a program operation, the page buffer 15 may operate as a write driver so as to input the data DATA desired to be stored in the memory cell array 11.

Figure 7:
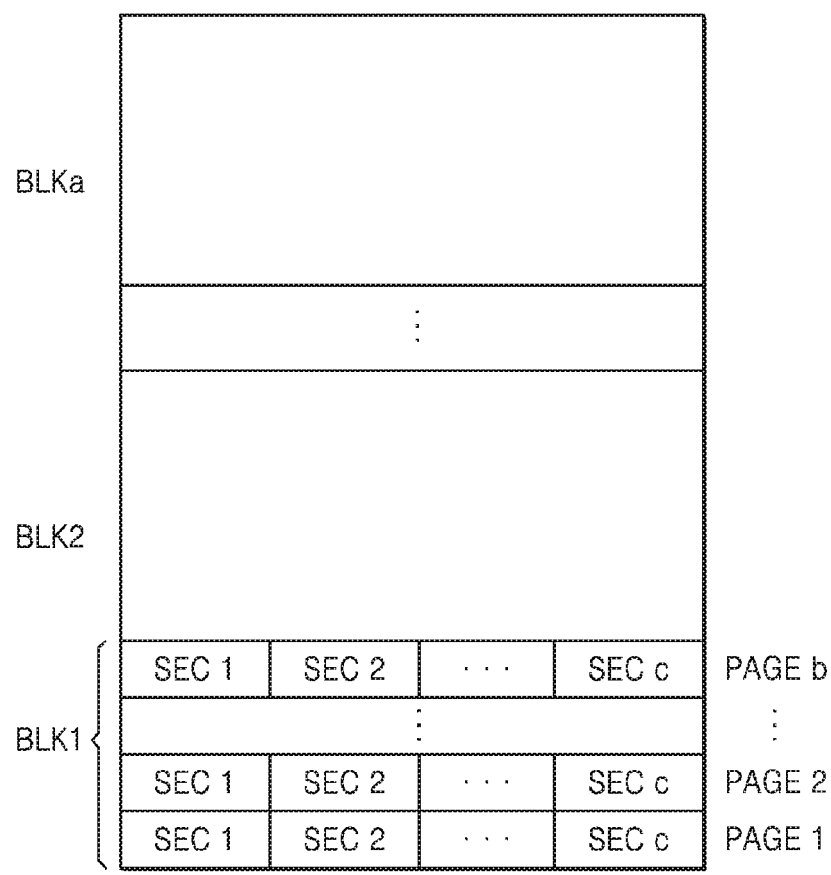
FIG. 7 is a diagram illustrating a memory cell array illustrated in FIG. 6.

FIG. 7 is a diagram illustrating the memory cell array illustrated in FIG. 6.

Referring to FIG. 7, the memory cell array 11 may be a flash memory cell array. In this case, the memory cell array 11 may include a plurality of memory blocks BLK1, . . . , and BLKa (where "a" denotes a positive integer which is equal to or greater than two) and each of the memory blocks BLK1, . . . , and BLKa may include a plurality of pages PAGE1, . . . , and PAGEb (where "b" denotes a positive integer which is equal to or greater than two). In addition, each of the pages PAGE1, . . . , and PAGEb may include a plurality of sectors SEC1, . . . , and SECc (where "c" denotes a positive integer which is equal to or greater than two). Although only the pages PAGE1 through PAGEb and the sectors SEC1 through SECc of the memory block BLK1 are illustrated for convenience of explanation in FIG. 7, the other memory blocks BLK2 through BLKa may have the same structures as that of the memory block BLK1.

Figure 8:
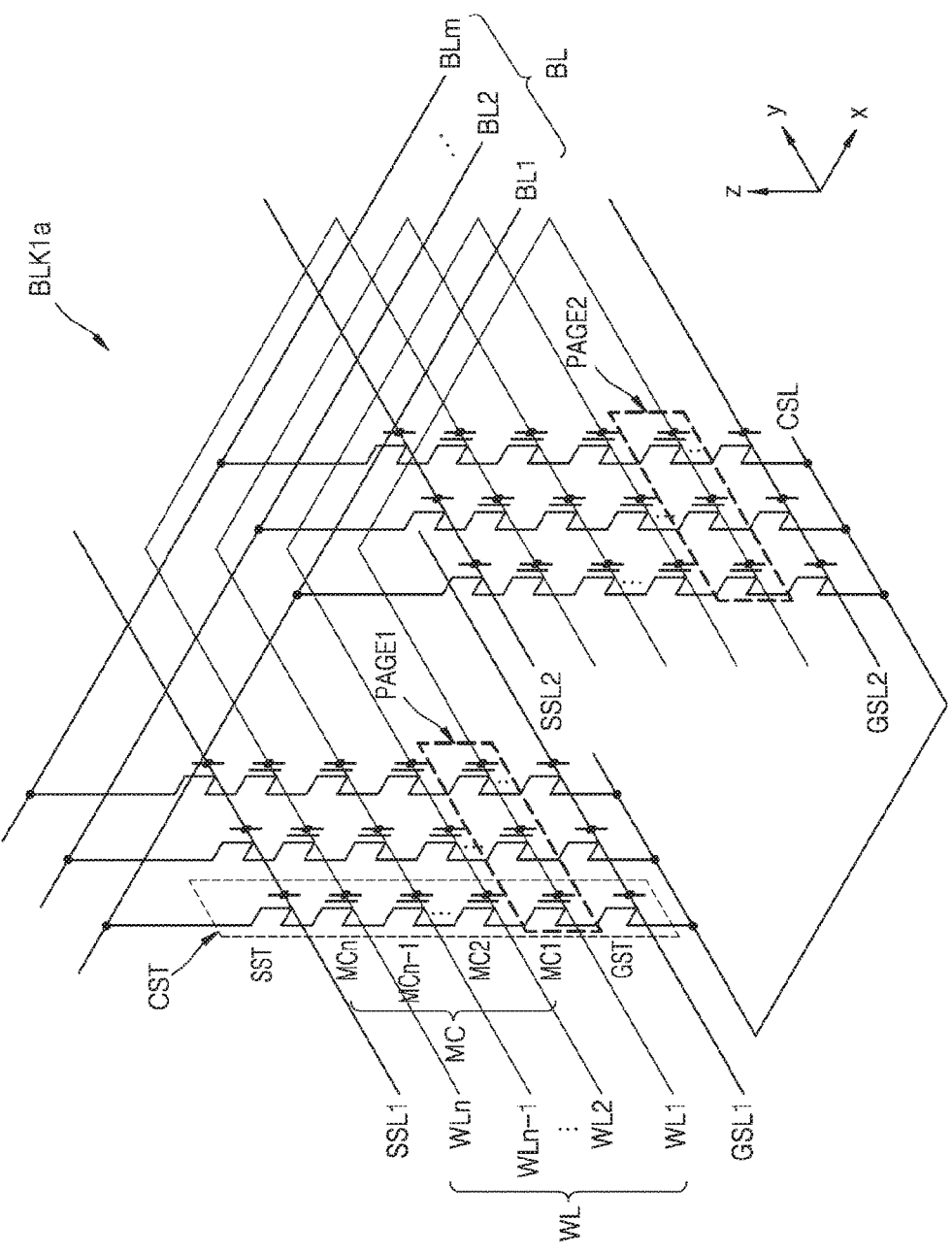
FIG. 8 is a circuit diagram of a first memory block included in a memory cell array illustrated in FIG. 6.

FIG. 8 is a circuit diagram of a first memory block BLK1*a*, which is an example embodiment of the memory block BLK1 included in the memory cell array 11 of FIG. 6.

Referring to FIG. 8, the first memory block BLK1*a* may be a NAND flash memory having a vertical structure. Each of the memory blocks BLK1 to BLKa may be implemented as shown in FIG. 8. In FIG. 8, a first direction is referred to as an x-direction, a second direction is referred to as a y-direction, and a third direction is referred to as a z-direction. However, example embodiments of the inventive concepts are not limited thereto, and the first through third directions may vary.

The first memory block BLK1*a* may include a plurality of cell strings CST, a plurality of word lines WL, a plurality of bit lines BL, a plurality of ground selection lines GSL1 and GSL2, a plurality of string selection lines SSL1 and SSL2, and a common source line CSL. The number of cell strings CST, the number of word lines WL, the number of bit lines BL, the number of ground selection lines GSL1 and GSL2, and the number of string selection lines SSL1 and SSL2 may vary according to example embodiments of the inventive concepts.

Each of the cell strings CST may include a string selection transistor SST, a plurality of memory cells MC, and a ground selection transistor GST that are serially connected to each other between a bit line BL corresponding to the cell string CST, and the common source line CSL. However, example embodiments of the inventive concepts are not limited thereto. According to another example embodiment, each cell string CST may further include at least one dummy cell. According to another example embodiment, each cell string CST may include at least two string selection transistors SST, or at least two ground selection transistors GST.

Each cell string CST may extend in the third direction (z-direction). In detail, each cell string CST may extend on a substrate in a vertical direction (z-direction). Accordingly, the first memory block BLK1*a* including the cell strings CST may be referred to as a vertical-direction NAND flash memory. As such, by extending each cell string CST in the vertical direction (z-direction) on a substrate, the integration density of the memory cell array 11 may increase.

The plurality of word lines WL may each extend in the first x-direction, and in the second y-direction y, and each word line WL may be connected to memory cells MC corresponding thereto. Accordingly, a plurality of memory cells MC arranged adjacent to each other on the same plane in the first x-direction, and the second y-direction, may be connected to each other by an identical word line WL. In detail, each word line WL may be connected to gates of memory cells MC to control the memory cells MC. In this case, the plurality of memory cells MC may store data and may be programmed, read, and/or erased under the control of the connected word line WL.

The plurality of bit lines BL may extend in the first x-direction, and may be connected to the string selection transistors SST. Accordingly, a plurality of string selection transistors SST arranged adjacent to each other in the first x-direction may be connected to each other by an identical bit line BL. In detail, each bit line BL may be connected to drains of the plurality of string selection transistors SST.

The plurality of string selection lines SSL1 and SSL2 may each extend in the second y-direction, and may be connected to the string selection transistors SST. Accordingly, a plurality of string selection transistors SST arranged adjacent to each other in the second y-direction may be connected to each other by an identical string selection line SSL1 or SSL2. In detail, each string selection line SSL1 or SSL2 may be connected to gates of the plurality of string selection transistors SST to control the plurality of string selection transistors SST.

The plurality of ground selection lines GSL1 and GSL2 may each extend in the second y-direction, and may be connected to the ground selection transistors GST. Accordingly, a plurality of ground selection transistors GST arranged adjacent to each other in the second y-direction may be connected to each other by an identical ground selection line GSL1 or GSL2. In detail, each ground selection line GSL1 or GSL2 may be connected to gates of the plurality of ground selection transistors GST to control the plurality of ground selection transistors GST.

The ground selection transistors GST respectively included in the cell strings CST may be connected to each other by the common source line CSL. In detail, the common source line CSL may be connected to sources of the ground selection transistors GST.

A plurality of memory cells MC connected to an identical word line WL, and to an identical string selection line SSL1 or SSL2, and arranged adjacent to each other in the second y-direction may be referred to as a page PAGE. For example, a plurality of memory cells MC that are connected to a first word line WL1, and to a first string selection line SSL1, and are arranged adjacent to each other in the second y-direction may be referred to as a first page PAGE1. A plurality of memory cells MC that are connected to the first word line WL1, and to a second string selection line SSL2, and are arranged adjacent to each other in the second direction y may be referred to as a second page PAGE2.

To perform a program operation with respect to a memory cell MC, 0V may be applied to a bit line BL, an "on" voltage may be applied to a string selection line SSL, and an "off" voltage may be applied to a ground selection line GSL. The "on" voltage may be equal to or greater than the threshold voltage so that a string selection transistor SST is turned on, and the "off" voltage may be smaller than the threshold voltage so that the ground selection transistor GST is turned off. A program voltage may be applied to a memory cell selected from the memory cells MC, and a pass voltage may be applied to the remaining unselected memory cells. In response to the program voltage, electric charges may be injected into the memory cells MC due to F-N tunneling. The pass voltage may be greater than the threshold voltage of the memory cells MC.

To perform an erasure operation with respect to the memory cells MC, an erasure voltage may be applied to the body of the memory cells MC, and 0V may be applied to the word lines WL. Accordingly, data stored in the memory cells MC may be temporarily erased.

Hereinafter, a method of managing a message transmission flow, according to an example embodiment of the inventive concepts will be described with reference to the structure of the computing system 1000A of FIG. 2.

It is assumed that a transaction between the host 100 and the storage device 200A, illustrated in FIG. 2, is performed through a UFS interface.

FIG. 9 is a diagram illustrating a UFS protocol information unit (UPIU) header format according to an example embodiment of the inventive concept.

FIG. 9 shows an example of a basic header format included in a UPIU according to a Joint Electron Device Engineering Council (JEDEC) standard that is used in a message transmission flow between the host 100, and the storage device 200A.

Referring to FIG. 9, a basic UPIU header includes a "Transaction Type" field, a "Flags" field, a "LUN" field, a "Task Tag" field, a "Reserved" field, a "Command Set Type" field, a "Query Function, Task Manag. Function" field, a "Response" field, a "Status" field, a "Total EHS Length" field, a "Device Information" field, and a "Data Segment Length" field.

The "Transaction Type" field is a field indicating the type of request or response included in a data structure. The "Flags" field includes various pieces of flag information.

FIG. 10 is a diagram illustrating content of a flag field of a UPIU header according to a JEDEC standard.

As shown in FIG. 10, a "Flags" field may include 8 bits. Bit 0 and Bit 1 indicate task attribute information, Bit 2 and Bit 3 are assigned as a reserved region, and Bit 4 to Bit 7 indicate operational flags information. For example, in a command UPIU type, a flag of Bit 6 indicates a "READ(R)" command state and a flag of Bit 5 indicates a "WRITE(W)" command state. For example, in a response UPIU type, a flag of Bit 6 indicates an "OVERFLOW(O)" state, a flag of Bit 5 indicates a "UNDERFLOW(U)" state, and a flag of Bit 4 indicates a "DATA OUT MISMATCH(D)" state.

The "LUN" field is a field indicating a logical unit number that is requested from a target device. The "Task Tag" field is a field indicating information about the generation of a task request. The "Reserved" field is a field that may be used by a vendor as an option to perform a certain function. The "Command Set Type" field is a field indicating information about a command set type. For example, the "Command Set Type" field is a field indicating a SCSI command set, a UFS-specific command set, or a vendor-specific command set. The "Query Function, Task Manag. Function" field is a field that is used to define a query function or a task management function. The "Response" field is a field indicating the success or failure of a request in a target device. The "Status" field is a field indicating a SCSI state. The "Total EHS Length" field is a field indicating the length of an extra header segment included in a UPIU. The "Device Information" field is a field indicating device level information. The "Data Segment Length" field is a field indicating the number of effective bytes in a data segment of a UPIU.

In the current exemplary embodiment, response transmission type information is defined by using one bit of a reserved region included in the "Flags" field of the basic UPIU header.

FIG. 11 is a diagram illustrating the definition of a flag field of a UPIU header according to an example embodiment of the inventive concepts.

Referring to FIG. 11, Bit 2 of a reserved region included in a "Flags" field of the UPIU header is used as a bit indicating response transmission type information. In other words, an "F" bit, which corresponds to Bit 2 of the reserved region included in the "Flags" field of the UPIU header, is defined as a bit indicating response transmission type information.

For example, a fast mode may be set when an "F" bit of a reserved region included in a "Flags" field of a command-type UPIU header, a data out-type UPIU header, or a data in-type UPIU header is set to a first logic value, and a normal mode may be set when the F″ bit of the reserved region is set to a second logic value. The first logic value may be "1", and the second logic value may be "0". As another example, the first logic value may be "0", and the second logic value may be "1".

FIG. 12 is a diagram illustrating the definition of a flag field of a UPIU header according to another example embodiment of the inventive concepts.

Referring to FIG. 12, Bit 3 of a reserved region included in a "Flags" field of the UPIU header is used as a bit indicating response transmission type information. In other words, an "F" bit, which corresponds to Bit 3 of the reserved region included in the "Flags" field of the UPIU header, is defined as a bit indicating response transmission type information.

For example, a fast mode may be set when an "F" bit of a reserved region included in a "Flags" field of a command-type UPIU header, a data out-type UPIU header, or a data in-type UPIU header is set to a first logic value, and a normal mode may be set when the F″ bit of the reserved region is set to a second logic value. The first logic value may be "1", and the second logic value may be "0". As another example, the first logic value may be "0", and the second logic value may be "1".

As another example, at least one bit included in a reserved region of a UPIU header illustrated in FIG. 13 may be defined as a bit indicating response transmission type information.

FIG. 13 is a diagram illustrating content of a command UPIU according to an exemplary embodiment of the inventive concept.

Referring to FIG. 3, 12 bytes indicated as 0 to 12 of the command UPIU are bytes forming a basic UPIU header. Since the basic UPIU header has been described with reference to FIGS. 9 to 12, repeated descriptions thereof are omitted.

A read command is set when an "R" bit of a "Flags" field of a UPIU header is set to "1", and a write command is set when a "W" bit of the "Flags" field of the UPIU header is set to "0". A "CDB" field of the command UPIU indicates a command descriptor block, and may include 16 bytes.

FIG. 14 is a diagram illustrating content of a ready to transfer (RTT) UPIU according to an example embodiment of the inventive concepts.

The RTT UPIU is issued by a target when being ready to receive data when processing a write command.

Referring to FIG. 14, 12 bytes indicated as 0 to 11 of the RTT UPIU are bytes forming a basic UPIU header. A "Data Buffer Offset" field is a field indicating a start position of a data segment, and a "Data Transfer Count" field is a field indicating the number of bytes of data that a device requested to be transmitted to the device.

FIG. 15 is a diagram illustrating content of a data out UPIU according to an example embodiment of the inventive concepts.

The data out UPIU is a UPIU for transmitting data from an initiator to a target when the target is ready to receive data. For example, the initiator may be the host 100 and the target may be the storage device 200A.

Referring to FIG. 15, 12 bytes indicated as 0 to 11 of the data out UPIU are bytes forming a basic UPIU header. A "Data Buffer Offset" field is a field indicating an offset of a UPIU data payload in a data transmission area, and a "Data Transfer Count" field is a field indicating the number of bytes of data that is transmitted to the target.

FIG. 16 is a diagram illustrating content of a data in UPIU according to an example embodiment of the inventive concepts.

The data in UPIU is a UPIU for transmitting data from a target to an initiator when processing a read command.

Referring to FIG. 16, 12 bytes indicated as 0 to 11 of the data in UPIU are bytes forming a basic UPIU header. A "Data Buffer Offset" field is a field indicating an offset of a UPIU data payload in a data transmission area, and a "Data Transfer Count" field is a field indicating the number of bytes of data that is transmitted to the initiator.

FIG. 17 is a diagram illustrating content of a response UPIU according to an example embodiment of the inventive concepts.

The response UPIU is a UPIU for transmitting state information, which indicates whether a command requested from an initiator is successfully processed in a target, to the initiator.

Referring to FIG. 17, 12 bytes indicated as 0 to 11 of the response UPIU are bytes forming a basic UPIU header. A "Response" field of a UPIU header is a field indicating whether a command transmitted from an initiator and a data processing are successfully performed. A "Flags" field of the UPIU header may indicate an overflow state, an underflow state, or a data out mismatch state of the target. A "Residual Transfer Count" field is a field indicating the number of bytes of data that is not transmitted or received from the initiator when data is transmitted or received at a speed that is higher or lower than expected. A "Sense Data" field is a field indicating the number of bytes of effectively sensed data.

A message transmission flow that is performed between the host 100 and the storage device 200A of the computing system 1000A illustrated in FIG. 2 will be now described with reference to FIGS. 18 through 21.

Figure 18:
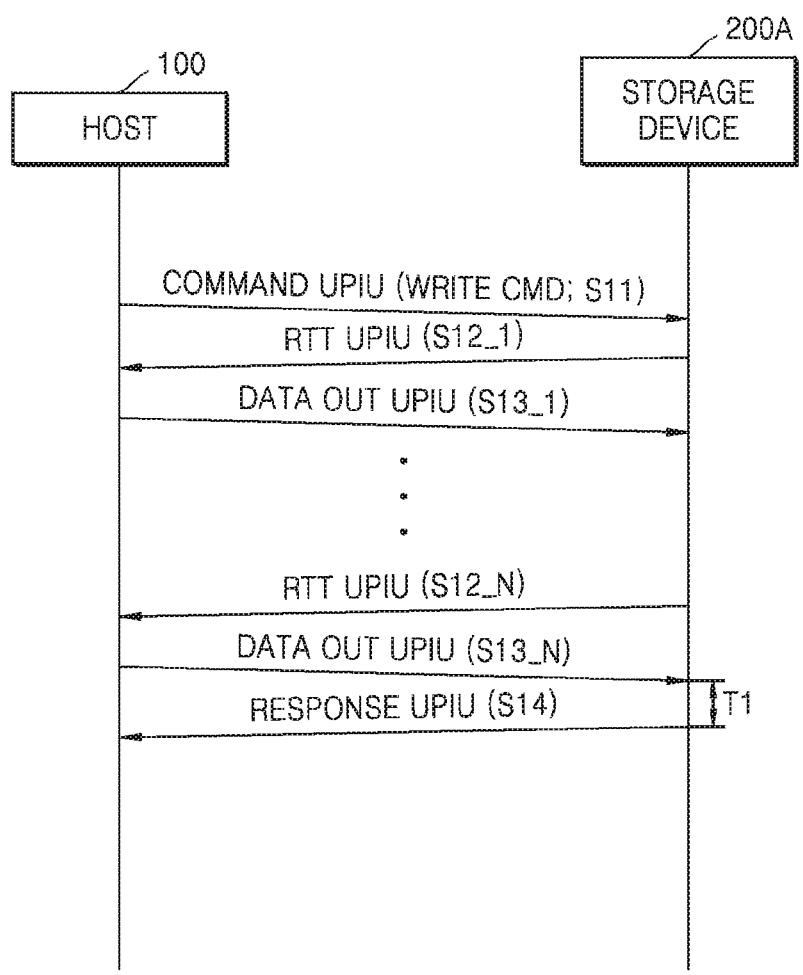
FIG. 18 is a flowchart illustrating a write message transmission flow for transmitting response information in a normal mode, according to an example embodiment of inventive concepts.

FIG. 18 is a flowchart illustrating a write message transmission flow for transmitting response information in a normal mode, according to an example embodiment of the inventive concepts.

When a write request is generated in a host 100, the host 100 generates a command UPIU indicating a write command WRITE CMD and transmits the generated command UPIU to a storage device 200A (operation S11). For example, the host 100 may generate a command UPIU indicating a write command by using a standard as illustrated in FIG. 13.

For example, response transmission type information may be set by using an "F" bit assigned as a bit indicating the response transmission type information, included in a header of the command UPIU, as shown in FIG. 11 and/or FIG. 12. In detail, the "F" bit may be set to a response transmission type of a normal mode. In another example, the normal mode is driven also when a bit indicating response transmission type information is not assigned in the header of the command UPIU, as shown in FIG. 10. In a read message transmission flow of FIG. 19, the normal mode is driven when the "F" bit is set to a normal mode, or when a bit indicating response transmission type information is not assigned in the header of the command UPIU.

For example, when the "F" bit is set to a response transmission type of a normal mode, or is set to a normal mode in which a bit indicating response transmission type information is not assigned, a write message transmission flow is as follows.

The storage device 200A receives a command UPIU and stores a write command included in the command UPIU in a command queue 213, and then generates an RTT UPIU, and transmits the generated RTT UPIU to the host 100 (operation S12_1). The storage device 200A may generate the RTT UPIU by using a standard as illustrated in FIG. 14.

The host 100 transmits a data out UPIU, which is first host data, to the storage device 200A after receiving the RTT UPIU (operation S13_1). The host 100 may generate the data out UPIU by using a standard as illustrated in FIG. 14.

The storage device 200A receives the data out UPIU and stores data included in the data out UPIU in the data buffer 212-1. Thereafter, when data to be received from the host 100 remains, the storage device 200A generates an RTT UPIU and transmits the generated RTT UPIU to the host 100. The host 100 transmits a data out UPIU, which is next host data, to the storage device 200A after receiving the RTT UPIU. In this manner, host data is transmitted to the storage device 200A.

The storage device 200A receives the data out UPIU, and then, when data to be received from the host 100 remains, the storage device 200A generates an N-th RTT UPIU (where N is an integer that is equal to or greater than 1), and transmits the generated N-th RTT UPIU to the host 100 (operation S12_N). The host 100 transmits a data out UPIU, which is N-th host data, to the storage device 200A after receiving the N-th RTT UPIU (operation S13_N).

For example, the data out UPIU generated in the operations S13_1 to S13_N may be a data out UPIU including a UPIU header having specifications of a flag field, as shown in FIG. 10.

As another example, the data out UPIU generated in the operations S13_1 to S13_N may be a data out UPIU including a UPIU header having specifications of a flag field as shown in FIGS. 11 and/or 12. In this case, an "F" bit may be set to a response transmission type of a normal mode.

When data included in the data out UPIU, which is the N-th host data, is last data, the storage device 200A generates a response UPIU after completing a data processing and transmits the generated response UPIU to the host 100 (operation S14). The response UPIU is status information indicating whether a write command received from the host 100 is normally processed. For example, the storage device 200A may generate the response UPIU by using a standard as shown in FIG. 17.

As described above, when a response transmission type is set to a normal mode, the storage device 200A may generate a response UPIU to transmit the generated response UPIU to the host 100 after completing an operation of storing data included in a data out UPIU, which is N-th host data, to the data buffer 212-1. As another example, when a response transmission type is set to a normal mode, the storage device 200A may generate a response UPIU to transmit the generated response UPIU to the host 100 after completing an operation of storing data included in a data out UPIU, which is N-th host data to the data buffer 212-1, and writing data stored in the data buffer 212-1 into the memory device 220A.

If N is 1, the operation S13_1 is performed and then the operation S14 is performed. In this case, the operations S12_N and S13_N are not performed.

Accordingly, in the normal mode, the latency T1 from a point in time when the storage device 200A receives a final data out UPIU to a point in time when the storage device 200A transmits a response UPIU to the host 100 is generated. For example, the period T1 may include a time that is needed while the storage device 200A processes final data received from the host 100, stores the processed final data in the data buffer 212-1, and then generates a response UPIU. As another example, the period T1 may include a time that is needed while the storage device 200A stores final data received from the host 100 in the data buffer 212-1, writes data stored in the data buffer 212-1 into the memory device 220A, and then generates a response UPIU.

Figure 19:
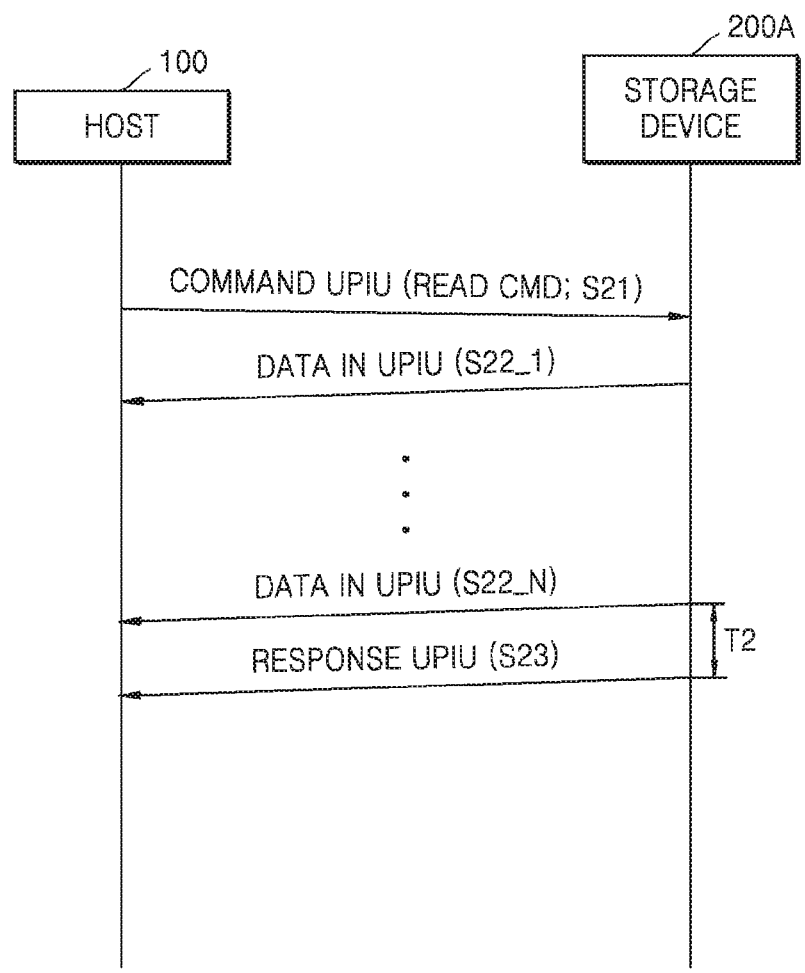
FIG. 19 is a flowchart illustrating a read message transmission flow for transmitting response information in a normal mode, according to an example embodiment of inventive concepts.

FIG. 19 is a flowchart illustrating a read message transmission flow for transmitting response information in a normal mode, according to an example embodiment of the inventive concept.

When a read request is generated in a host 100, the host 100 generates a command UPIU indicating a read command READ CMD and transmits the generated command UPIU to a storage device 200A (operation S21). For example, the host 100 may generate a command UPIU indicating a read command by using a standard as illustrated in FIG. 13. For example, response transmission type information may be set by using an "F" bit assigned as a bit indicating the response transmission type information, included in a header of the command UPIU, as shown in FIG. 11 and/or FIG. 12. In detail, the "F" bit may be set to a response transmission type of a normal mode. In another example, the normal mode is driven also when a bit indicating response transmission type information is not assigned in the header of the command UPIU, as shown in FIG. 10. In a read message transmission flow of FIG. 19, the normal mode is driven when the "F" bit is set to a normal mode, or also when a bit indicating response transmission type information is not assigned in the header of the command UPIU.

The storage device 200A receives a command UPIU and stores a read command included in the command UPIU in a command queue 213, and then performs an operation of reading data from the memory device 220A, and storing the read data to the data buffer 212-1, according to a command stored in the command queue 213.

After completing such an operation, the storage device 200A divides data stored in the data buffer 212-1 by units of transmission sizes and sequentially transmits the divided data to the host 100 (operations S22_1 to S22_N). In other words, the storage device 200A generates N data in UPIUs (wherein N is an integer that is equal to or greater than 1), and sequentially transmits the generated N data in UPIUs to the host 100. The storage device 200A may generate the data in UPIUs by using a standard as illustrated in FIG. 16.

For example, the data in UPIUs generated in the operations S22_1 to S22_N may be data in UPIUs each including a UPIU header having specifications of a flag field as shown in FIG. 10.

As another example, the data in UPIUs generated in the operations S22_1 to S22_N may be data in UPIUs each including a UPIU header having specifications of a flag field as shown in FIGS. 11 and/or 12. In this case, an "F" bit is to be set to a response transmission type of a normal mode.

The storage device 200A generates a response UPIU after completing data transmission to the host 100 according to a read command, and transmits the generated response UPIU to the host 100 (operation S23). The response UPIU is status information indicating whether a read command received from the host 100 is normally processed. For example, the storage device 200A may generate the response UPIU by using a standard as shown in FIG. 17.

If N is 1, the operation S22_1 is performed and then the operation S23 is performed. In this case, the operation S22_N is not performed.

When a response transmission type is set to a normal mode as described above, the latency T2 from a point in time when the storage device 200A transmits a final data in UPIU to the host 100 to a point in time when the storage device 200A transmits a response UPIU to the host 100 is generated. For example, the period T2 may include a time that is needed for transmitting final data to the host 100 and then generating a response UPIU. As another example, the period T2 may include a time that is needed for performing an operation of transmitting final data to the host 100 and then emptying the data buffer 212-1.

Figure 20:
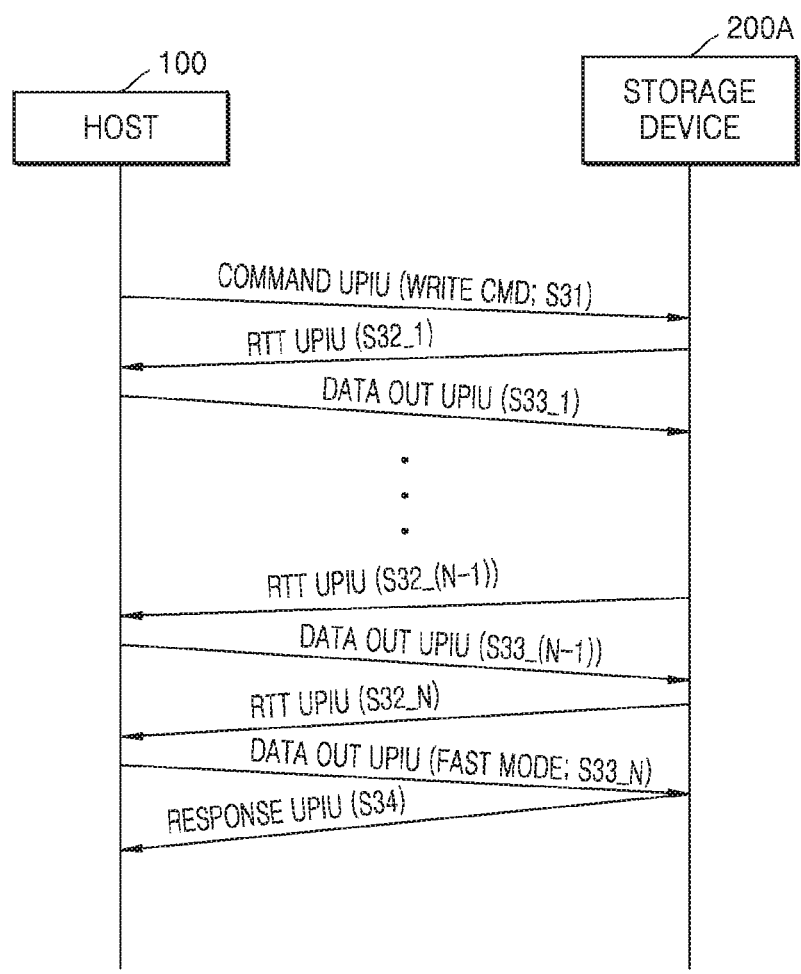
FIG. 20 is a flowchart illustrating a write message transmission flow for transmitting response information in a fast mode, according to an example embodiment of inventive concepts.

FIG. 20 is a flowchart illustrating a write message transmission flow for transmitting response information in a fast mode, according to an example embodiment of the inventive concepts.

When a write request is generated in a host 100, the host 100 generates a command UPIU indicating a write command WRITE CMD and transmits the generated command UPIU to a storage device 200A (operation S31). For example, the host 100 may generate a command UPIU indicating a write command by using a standard as illustrated in FIG. 13.

For example, in an operation S31, the host 100 may set an "F" bit, which indicates response transmission type information, in a header of a command UPIU in the same manner as a normal mode. As another example, the host 100 may generate a command UIPU having a UPIU flags standard as shown in FIG. 10, in the same manner as a normal mode that does not uses an "F" bit. As another example, in the operation S31, the host 100 may set response transmission type information indicating a fast mode by using an "F" bit assigned as a bit indicating the response transmission type information, where the F" bit is included in a header of a command UPIU. In other words, an F" bit may be set to a response transmission type of a fast mode.

In the operation S31 of the current exemplary embodiment, the host 100 generates a command UPIU by using the same standard as a normal mode that does not use an "F" bit.

The storage device 200A receives a command UPIU and stores a write command included in the command UPIU in a command queue 213, and then generates an RTT UPIU and transmits the generated RTT UPIU to the host 100 (operation S32_1). The storage device 200A may generate the RTT UPIU by using a standard as illustrated in FIG. 14.

The host 100 transmits a data out UPIU, which is first host data, to the storage device 200A after receiving the RTT UPIU (operation S33_1). The host 100 may generate the data out UPIU by using a standard as illustrated in FIG. 14.

The storage device 200A receives the data out UPIU and stores data included in the data out UPIU in the data buffer 212-1. Thereafter, when data to be received from the host 100 remains, the storage device 200A generates an RTT UPIU and transmits the generated RTT UPIU to the host 100. The host 100 transmits a data out UPIU, which is next host data, to the storage device 200A after receiving the RTT UPIU. In this manner, host data is transmitted to the storage device 200A.

For example, the data out UPIU generated in the operations S33_1 to S33_N may be a data out UPIU including a UPIU header having specifications of a flag field as shown in FIG. 10.

As another example, the data out UPIU generated in the operations S33_1 to S33_N may be a data out UPIU including a UPIU header having specifications of a flag field as shown in FIGS. 11 and/or 12. In this case, an "F" bit may be set to a response transmission type of a normal mode.

The storage device 200A receives the data out UPIU, and then, when data to be received from the host 100 remains, the storage device 200A generates an N-th RTT UPIU (where N is an integer that is equal to or greater than 1), and transmits the generated N-th RTT UPIU to the host 100 (operation S32_N). The host 100 transmits a data out UPIU, which is N-th host data, to the storage device 200A after receiving the N-th RTT UPIU (operation S33_N). In the operation S33_N of transmitting final data, the host 100 generates a data out UPIU including a UPIU header that sets a response transmission type of a fast mode by using an "F" bit in specifications of a flag field as illustrated in FIGS. 11 and/or 12.

When an N-th final data out UPIU is received, the storage device 200A determines whether an "F" bit included in a header of the final data out UPIU is set to a fast mode. When it is determined that the "F" bit included in the header of the final data out UPIU is set to a fast mode, the storage device 200A generates a response UPIU and directly transmits the generated response UPIU to the host 100 (operation S34). The storage device 200A may generate the response UPIU by using a standard as illustrated in FIG. 17.

When N is 1, the operations S32_1 to S33_(N−1) are not performed, and the operations S32_N and S33_N are performed.

In this manner, the storage device 200A immediately transmits a response UPIU to the host 100 after receiving a final data out UPIU in a fast mode. For example, the storage device 200A may perform an operation of storing a final data out UPIU in the data buffer 212-1 after generating a response UPIU and transmitting the generated response UPIU to the host 100. As another example, the storage device 200A may perform an operation of storing a final data out UPIU in the data buffer 212-1 in parallel with an operation of generating a response UPIU and transmitting the generated response UPIU to the host 100.

Accordingly, latency from a point in time when the storage device 200A receives a final data out UPIU to a point in time when the storage device 200A transmits a response UPIU to the host 100 may be reduced. In other words, latency T1 that occurs in a write message transmission flow according to a normal mode as in FIG. 18 may be reduced in a fast mode.

Figure 21:
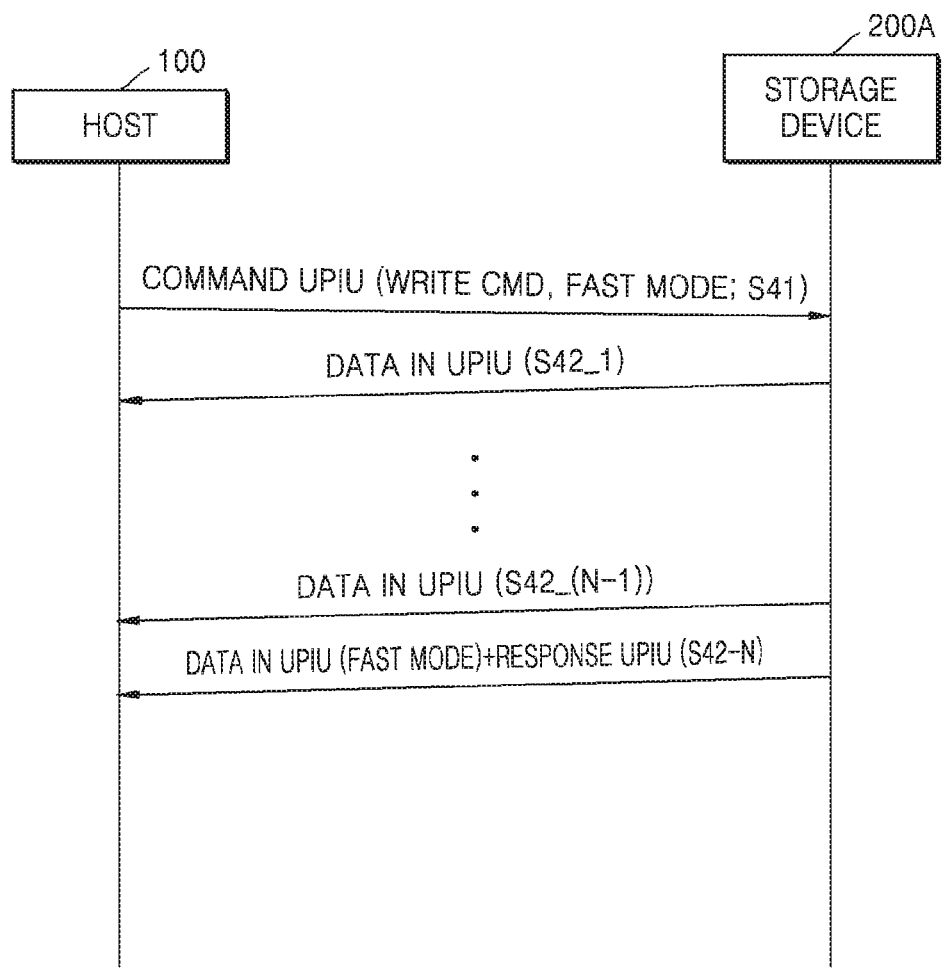
FIG. 21 is a flowchart illustrating a read message transmission flow for transmitting response information in a fast mode, according to an example embodiment of inventive concepts.

FIG. 21 is a flowchart illustrating a read message transmission flow for transmitting response information in a fast mode, according to an example embodiment of the inventive concepts.

When a read request is generated in a host 100, the host 100 generates a command UPIU indicating a read command READ CMD and transmits the generated command UPIU to a storage device 200A (operation S41). For example, the host 100 may generate a command UPIU indicating a read command by using a standard as illustrated in FIG. 13. For example, as shown in FIG. 11 and/or FIG. 12, an "F" bit assigned as a bit indicating the response transmission type information, included in a header of the command UPIU, is set to a response transmission type of a fast mode.

The storage device 200A receives a command UPIU and stores a read command included in the command UPIU in a command queue 213, and then performs an operation of reading data from the memory device 220A and storing the read data to the data buffer 212-1, according to a command stored in the command queue 213. For example, the storage device 200A may store information about an "F" bit included in a command UPIU in a register other than the command queue 213.

After completing such an operation, the storage device 200A divides data stored in the data buffer 212-1 by units of transmission sizes and sequentially transmits data before final data to the host (operations S42_1 to S42_(N−1)). In other words, the storage device 200A generates N data in UPIUs (wherein N is an integer that is equal to or greater than 1) and sequentially transmits the generated N data in UPIUs to the host 100. The storage device 200A may generate the data in UPIUs by using a standard as illustrated in FIG. 16.

For example, the data in UPIUs generated in the operations S42_1 to S42_(N−1) may be data in UPIUs each including a UPIU header having specifications of a flag field as shown in FIG. 10.

As another example, the data in UPIUs generated in the operations S42_1 to S42_(N−1) may be data in UPIUs each including a UPIU header having specifications of a flag field as shown in FIGS. 11 and/or 12. In this case, an "F" bit is be set to a response transmission type of a normal mode.

Next, the storage device 200A checks a register, which stores information about an "F" bit included in a command UPIU received in the operation S41, before transmitting the final data to the host 100.

When the information about the "F" bit, stored in the register, indicates a fast mode, the storage device 200A generates a data in UPIU including a UPIU header that sets a response transmission type of a fast mode by using an "F" bit in specifications of a flag field as illustrated in FIGS. 11 and/or 12. Also, the storage device 200A generates a response UPIU in addition to the data in UPIU. The storage device 200A may generate the response UPIU by using a standard as illustrated in FIG. 17.

Then, the storage device 200A loads the response UPIU on the data in UPIU including a UPIU header that sets a response transmission type of a fast mode by using an "F" bit, and transmits both the data in UPIU and the response UPIU to the host 100 (operation S42_N).

If N is 1, the operations S42_1 to S42_(N−1) are not performed.

When an "F" bit included in a header of the data in UPIU is set to a value indicating a fast mode, the host 100 parses the response UPIU received after the data in UPIU to process the response UPIU.

In this manner, the storage device 200A loads a response UPIU on a final data in UPIU in which an "F" bit is set to a fast mode, and transmits the response UPIU as well as the final data in UPIU to the host 100.

Accordingly, latency from a point in time when the final data in UPIU is transmitted to the host 100 to a point in time when the response UPIU is transmitted to the host 100 may be reduced. In other words, latency T2 that occurs in a write message transmission flow according to a normal mode as in FIG. 19 may be reduced in a fast mode.

Next, a method of managing a message transmission flow, which is performed in various types of computing systems according to exemplary embodiments of the inventive concept, is described below with reference to flowcharts of FIGS. 22 and 23.

Figure 22:
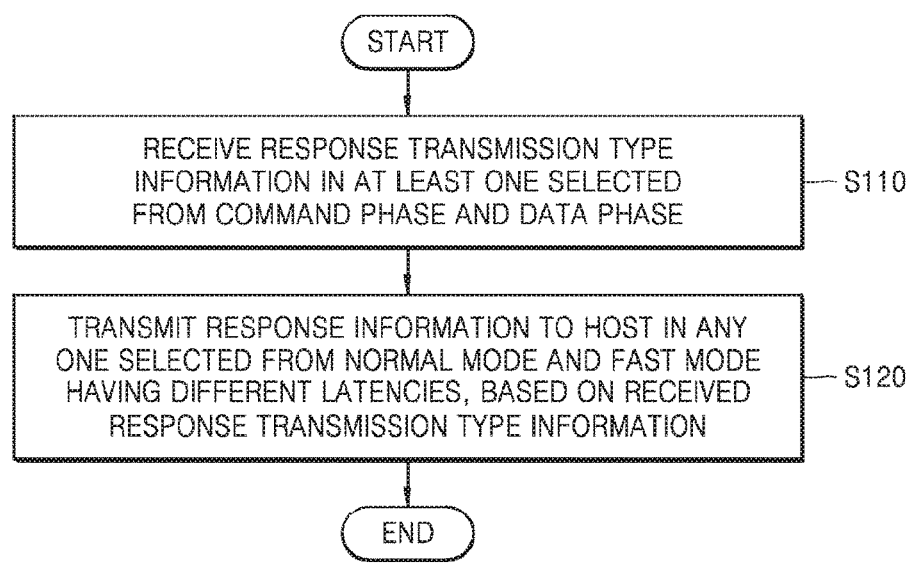
FIG. 22 is a flowchart illustrating a method of managing a message transmission flow, according to an example embodiment of inventive concepts.

FIG. 22 is a flowchart illustrating a method of managing a message transmission flow, according to an example embodiment of the inventive concepts.

First, a device receives response transmission type information from a host in at least one selected from a command phase and a data phase (operation S110).

For example, response transmission type information may be received through a reserved bit included in a header of command information or a header of pieces of data which are transmitted from the host. Specifically, when an interface standard that is used between the host and the device is a UFS interface, response transmission type information may be received through a reserved bit included in a UPIU header. The reserved bit may include a reserved bit of a flag field of an UPIU. As a specific example, response transmission type information may be received through an "F" bit of a UPIU flag field illustrated in FIG. 11S and/or FIG. 12.

For example, in a read data transmission flow, the device may receive response transmission type information through a reserved bit included in a header of a command UPIU. As another example, in a write data transmission flow, the device may receive response transmission type information through a reserved bit included in a header of a data out UPIU.

Next, the device transmits response information to the host 100 in any one selected from a normal mode and a fast mode having different latencies, based on response transmission type information received from the host (operation S120). For example, when the received response transmission type information indicates the normal mode, the device transmits response information to the host in the normal mode. As another example, when the received response transmission type information indicates the fast mode, the device transmits response information to the host in the fast mode in which latency is shorter than that in the normal mode.

Figure 23:
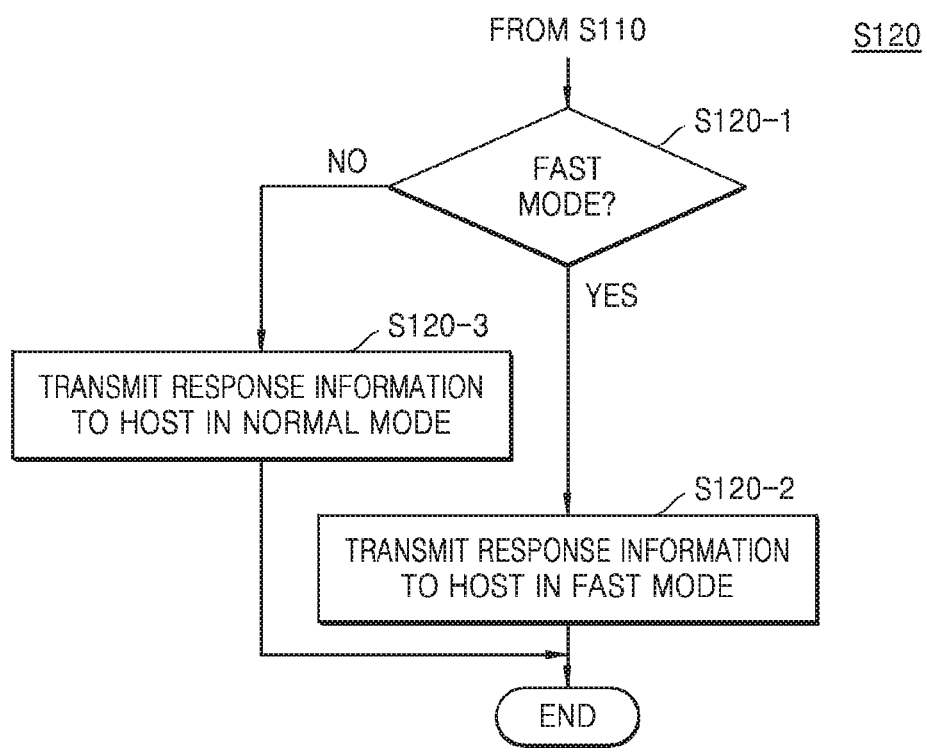
FIG. 23 is a flowchart illustrating a response information transmission operation illustrated in FIG. 22 in detail.

FIG. 23 is a flowchart illustrating the response information transmission operation S120, illustrated in further detail in FIG. 22.

A device detects response transmission type information received from a host in at least one selected from a command phase, and a data phase, and determines whether the detected response transmission type information indicates a fast mode (operation S120-1).

If, in the operation S120-1, it is determined that the detected response transmission type information indicates the fast mode, the device transmits response information to the host in a fast mode in a write message transmission flow, and/or a read message transmission flow (operation S120-2).

For example, if it is determined that a response transmission mode in a write data transmission flow is a fast mode, the device directly transmits response information to the host after receiving final data from the host. Specifically, when response transmission type information of the fast mode is received through a reserved bit included in a header of a final data out UPIU of a data phase in the write data transmission flow, the device may transmit a response UPIU to the host as soon as the device receives a final data out UPIU.

As another example, if it is determined that a response transmission mode in a read data transmission flow is a fast mode, the device loads response information on final data of a data phase and transmits the response information, as well as the final data to the host. Specifically, if it is determined that a response transmission mode in a read data transmission flow is a fast mode, the device may set a reserved bit, assigned to indicate response transmission type information of final data in UPIU of a data phase, to a value indicating response transmission type information of a fast mode, and may immediately transmit a response UPIU to the host after transmitting the final data in UPIU to the host.

If, in the operation S120-1, it is determined that the detected response transmission type information does not indicate the fast mode, the device transmits response information to the host in a normal mode in a write message transmission flow, and/or a read message transmission flow (operation S120-3).

For example, if it is determined that a response transmission mode in a write data transmission flow is a normal mode, the device may transmit response information to the host after completing an operation of storing data received from the host in a data buffer. As another example, if it is determined that a response transmission mode in a write data transmission flow is a normal mode, the device may transmit response information to the host after completing an operation of writing data received from the host into a memory device.

As another example, if it is determined that a response transmission mode in a read data transmission flow is a normal mode, the device may generate response information to transmit the generated response information to the host after completing an operation of transmitting data, read from a memory device, and then stored in a data buffer to the host. As another example, in accordance with the inventive concepts, if it is determined that a response transmission mode in a read data transmission flow is a normal mode, the device may perform an operation of emptying a data buffer after completing an operation of transmitting data, read from a memory device, and then stored in a data buffer to the host and then may generate response information, and transmit the generated response information to the host.

Figure 24:
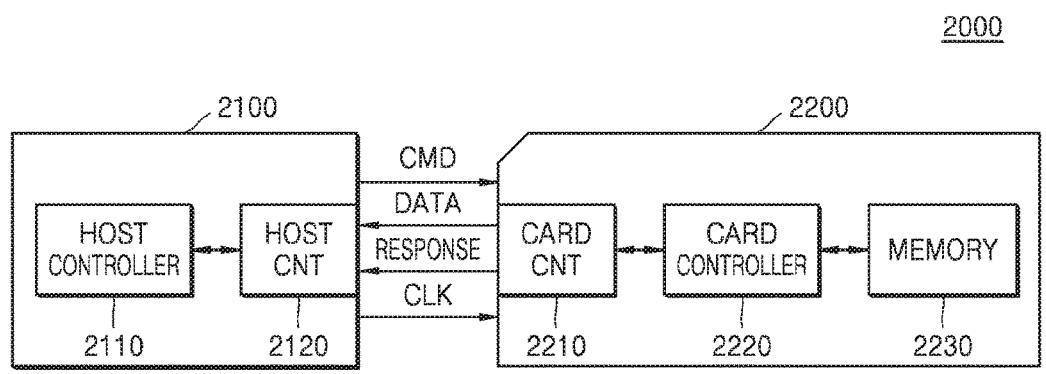
FIG. 24 is a block diagram of a memory card system using the method of managing a message transmission flow, according to an example embodiment of inventive concepts.

FIG. 24 is a block diagram of a memory card system 2000 using the method of managing a message transmission flow, according to an example embodiment of the inventive concepts.

Referring to FIG. 24, the memory card system 2000 may include a host 2100 and a memory card 2200. The host 2100 may include a host controller 2110 and a host connector 2120. The memory card 2200 may include a card connector 2210, a card controller 2220 and a memory device 2230. The host controller 2110 includes hardware and/or software for the fast response support module 101 illustrated in FIG. 1, and the card controller 2220 includes hardware and/or software for the fast response processing module 201, as illustrated in FIG. 1. Accordingly, the method of managing a message transmission flow, described above with reference to FIGS. 18 through 23, may be performed between the host 2100 and the memory card 2200.

The host 2100 may write data into the memory card 2200, and/or may read data from the memory card 2200. The host controller 2110 may transmit a command CMD, a clock signal CLK that is generated by a clock generator (not shown) in the host 2100, and data DATA to the memory card 2200 via the host connector 2120.

In response to a command received via the card connector 2210, the card controller 2220 may store data in the memory device 2230 in synchronization with a clock signal generated by a clock generator (not shown) in the card controller 2220. The memory device 2230 may store data transmitted from the host 2100. The card controller 2220 may generate reference information in a fast mode and/or a normal mode based on response transmission type information received from the host 2100, and transmit the generated reference information to the host 2100.

The memory card 2200 may be implemented with, including but not limited to, a compact flash card (CFC), a microdrive, a smart media card (SMC), a multimedia card (MMC), a security digital card (SDC), a memory stick, a USB flash memory driver, or the like.

Figure 25:
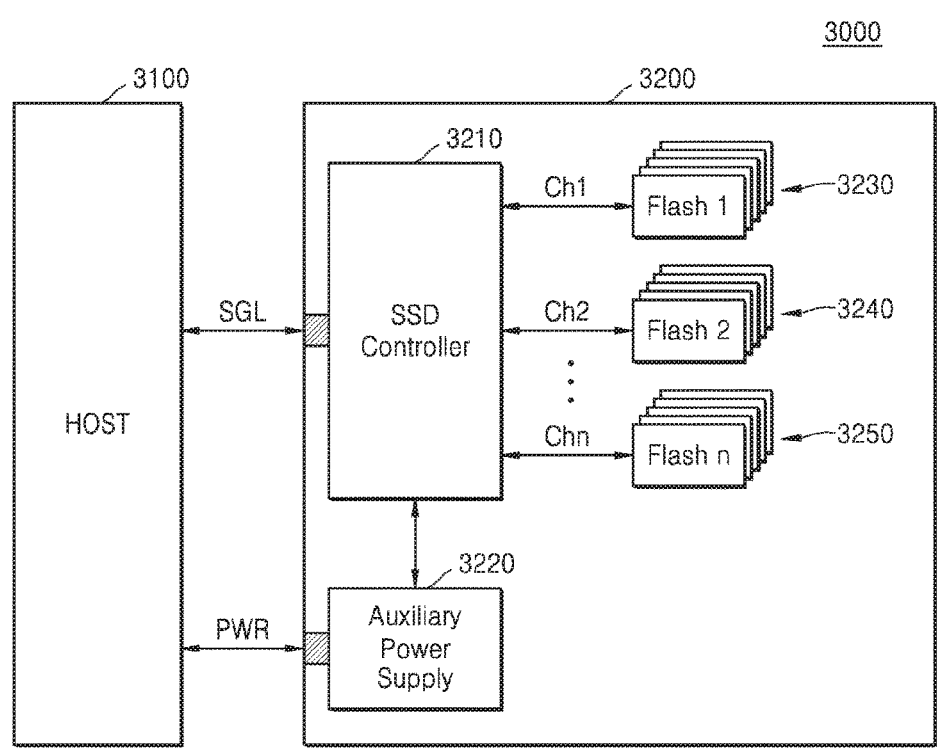
FIG. 25 is a block diagram of a solid state drive (SSD) system using the method of managing a message transmission flow, according to an example embodiment of inventive concepts.

FIG. 25 is a block diagram of a solid state drive (SSD) system 3000 using the method of managing a message transmission flow, according to an example embodiment of the inventive concepts.

Referring to FIG. 25, the SSD system 3000 may include a host 3100 and an SSD 3200. The SSD 3200 sends and/or receives signals to or from the host 3100 via a signal connector, and receives a power supply voltage via a power connector. The SSD 3200 may include an SSD controller 3210, an auxiliary power supply 3220, and a plurality of memory devices 3230, 3240, and 3250. The host controller 3110 includes hardware and/or software for the fast response support module 101 illustrated in FIG. 1, and the SSD controller 3210 includes hardware and/or software for the fast response processing module 201, as illustrated in FIG. 1. Accordingly, the method of managing a message transmission flow, described above with reference to FIGS. 18 through 23, may be performed between the host 3100 and the SSD 3200.

Figure 26:
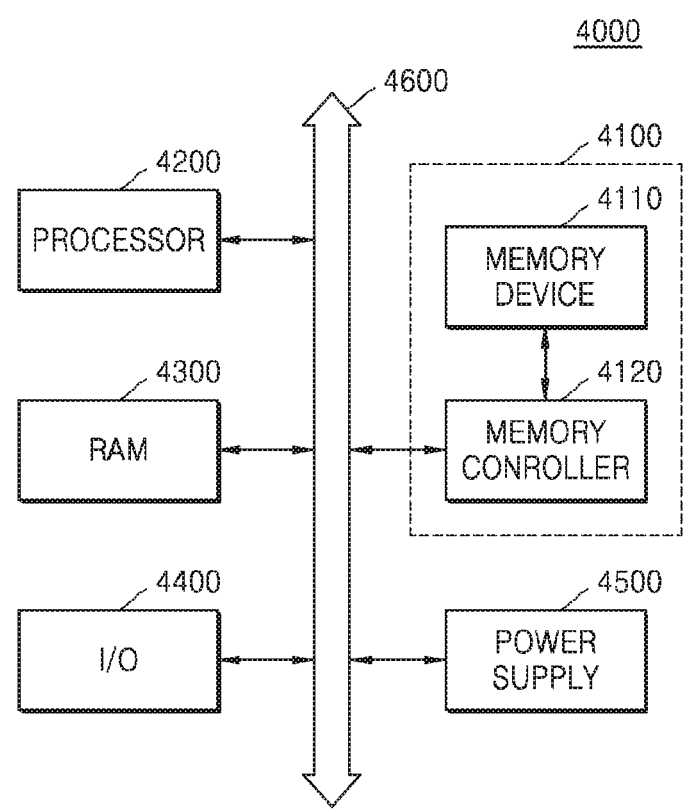
FIG. 26 is a diagram illustrating a structure of a computing system using the method of managing a message transmission flow, according to an example embodiment of inventive concepts.

FIG. 26 is a diagram illustrating a structure of a computing system 4000 using the method of managing a message transmission flow, according to an example embodiment of the inventive concepts.

Referring to FIG. 26, the computing system 4000 may include a memory system 4100, a processor 4200, RAM 4300, an input/output (I/O) device 4400, a power supply device 4500, and a bus 4600. The memory system 4100 may include a memory device 4110 and a memory controller 4120. Although not shown in FIG. 26, the computing system 4000 may further include ports that may communicate with, including but not limited to, a video card, a sound card, a memory card, a universal serial bus (USB) device, and/or other electronic devices. The computing system 4000 may be implemented with a personal computer (PC), or a portable electronic device, such as, including but not limited to, a notebook computer, a mobile phone, a personal digital assistant (PDA), and/or a camera.

The processor 4200 may perform specific calculations and/or tasks. According to an example embodiment, the processor 4200 may be a microprocessor or a central processing unit (CPU). The processor 4200 may communicate with the RAM 4300, the I/O device 4400, and the memory system 4100 via the bus 4600, such as an address bus, a control bus, or a data bus. According to an example embodiment, the processor 4200 may also be connected to an extended bus, such as a peripheral component interconnect (PCI) bus.

The RAM 4300 may store data that is required to perform an operation of the computing system 4000. A memory device according to an example embodiment of the inventive concept may be used as the RAM 4300. In addition, including but not limited to, DRAM, mobile DRAM, SRAM, PRAM, FRAM, RRAM, and/or MRAM may be used as the RAM 4300.

The I/O device 4400 may include an input unit, such as, including but not limited to, a keyboard, a keypad, or mouse; and an output unit, such as, including but not limited to, a printer or a display. The power supply device 4500 may supply an operating voltage required to perform the operation of the computing system 4000.

The processor 4200 and the RAM 4300 may be the processor 110 and the RAM 120, as illustrated in FIG. 3, and the memory controller 4120 may be the memory controller 210A, as illustrated in FIG. 2.

A storage device according to any of the above embodiments of the inventive concept may be embedded using various types of packages. For example, the storage device may be embedded using packages, such as package on package (POP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline integrated circuit (SOIC), shrink small outline package (SSOP), thin small outline (TSOP), system in package (SIP), multi-chip package (MCP), wafer-level fabricated package (WFP), and wafer-level processed stack package (WSP).

While the inventive concept has been particularly shown and described with reference to exemplary embodiments thereof, it will be understood that various changes in form and details may be made therein without departing from the spirit and scope of the following claims.

The unit and/or module described herein may be implemented using hardware components, software components, or a combination thereof. For example, the hardware components may include microcontrollers, memory module, sensors, amplifiers, band-pass filters, analog to digital converters, and processing devices, or the like. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors, multi-core processors, distributed processing, or the like.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, or computer storage medium or device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of some example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software module in order to perform the operations of the above-described example embodiments, or vice versa.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A method of managing a message transmission flow, the method comprises:
   receiving, at a storage device, a response transmission type information during at least one of a command phase and a data phase, the response transmission type information including a reserved bit indicating a response transmission type;
   setting, at the storage device, a control unit of the storage device to one of a normal mode or a fast mode based on the response transmission type indicated in the response transmission type information, the normal mode and the fast mode having different latencies; and
   transmitting, at the storage device, a response information to a host, the transmitting being performed during at least one of the normal mode and the fast mode.

2. The method of claim 1, wherein the reserved bit is included in at least one of a header of command information and in a header of data, the host is configured to transmit the reserved bit.

3. The method of claim 1, further comprising:
   interfacing between the host and the storage device based on a transmission flow, the transmission flow including a command phase, a data phase and a status phase.

4. The method of claim 1, wherein the receiving of the response transmission type information is through a reserved bit included in a universal flash storage (UFS) protocol information unit (UPIU) header, if the host and the storage device interface with each other using the UFS.

5. The method of claim 1, wherein the receiving of the response transmission type information is in a read data transmission flow, the storage device is configured to receive the response transmission type information through a reserved bit, the reserved bit is included in a header of command information.

6. The method of claim 1, wherein the receiving of the response transmission type information is in a write data transmission flow, the storage device is configured to receive the response transmission type information through a reserved bit, the reserved bit is included in a header of data.

7. The method of claim 6, wherein in the write data transmission flow, the receiving of the response transmission type information includes receiving the response transmission type information through the reserved bit, the reserved bit is included in a header of final data in the data phase.

8. The method of claim 1, wherein the transmitting of the response information to the host further comprises:

determining whether a response transmission mode is at least one of the normal mode and the fast mode based on the response transmission type information;

loading the response information on final data; and transmitting to the host the response information and the final data in the data phase if it is determined that the response transmission mode in a read data transmission flow is the fast mode.

9. The method of claim 8, wherein the transmitting of the response information and the final data to the host further comprises:

setting a reserved bit, the reserved bit is configured to,
indicate the response transmission type information included in a header of final data in the data phase, and
assign a value indicating the response transmission type information of the fast mode if it is determined that in the read data transmission flow the response transmission mode is the fast mode; and loading the response information on the final data to transmit both the response information and the final data to the host.

10. The method of claim 1, wherein the transmitting of the response information to the host further comprises:

determining whether a response transmission mode is the normal mode or the fast mode based on the response transmission type information; and transmitting the response information to the host after receiving final data from the host if it is determined that the response transmission mode in a write data transmission flow is the fast mode.

11. The method of claim 10, wherein the transmitting of the response information to the host further comprises:

receiving the final data if the response information of the fast mode is received through a reserved bit included in a header of the final data of the data phase in the write data transmission flow.

12. A storage device comprising:
a memory device; and
a memory controller configured to,
write data to the memory device or read data from the memory device based on a command received from a host,
set the memory controller to one of a normal mode or a fast mode based on a response transmission type information received from the host, the normal mode and the fast mode having different latencies, the response transmission type information including a reserved bit indicating a response transmission type,
transmit a response information to the host in at least one of the normal mode and the fast mode based on the response transmission type information, and
interface between the host and the memory device based on at least one of a command phase and a data phase.

13. The storage device of claim 12, wherein the reserved bit is included in at least one of a header of command information and data transmitted from the host.

14. The storage device of claim 12, wherein the memory controller comprises:
a command queue configured to store command information received from the host;
a buffer memory configured to store data, the data stored is either received from the host or read from the memory device; and
a controller configured to,
load the response information on final data read from the buffer memory based on a read command when the response transmission type information set to the fast mode in a read data transmission flow is received, and
transmit the response information and the final data to the host.

15. The storage device of claim 14, wherein the controller is further configured to,
set a reserved bit, the reserved bit is configured to,
indicate the response transmission type information included in a header of the final data in the data phase, and
assign a value indicating the response transmission type information of the fast mode if it is determined that a response transmission mode in the read data transmission flow is the fast mode, and
load the response information on the final data to transmit both the response information and the final data to the host.

16. A method of managing a message transmission flow at a storage device, the method comprising:

Detecting, at the storage device, a response transmission type information received from a host in at least one of a command phase and a data phase, the response transmission type information including a reserved bit indicating a response transmission type;

Determining, at the storage device a response transmission mode from at least one of a fast mode and a normal mode based on the response transmission type information;

setting, at the storage device, the storage device to one of a normal mode or a fast mode based on the response transmission type indicated in the response transmission type information, the normal mode and the fast mode having different latencies; and transmitting, at the storage device, a response information to the host in at least one of a write data transmission flow and a read data transmission flow based on the response transmission type information.

17. The method of claim 16, wherein the transmitting of the response information directly to the host if the response transmission mode is the fast mode in the write data transmission flow.

18. The method of claim 16, wherein,
the response information is loaded on final data of the data phase, and
the transmitting the response information with the final data to the host if the response transmission mode is the fast mode in the read data transmission flow.

19. The method of claim 16, wherein the transmitting the response information to the host after completing an operation of storing data received from the host in a buffer data if the response transmission mode is the normal mode in the write data transmission flow.

20. The method of claim 16, wherein the transmitting the response information to the host after completing an operation of transmitting data if the response transmission mode is the normal mode in the read data transmission flow.

* * * * *